United States Patent
Dill et al.

(10) Patent No.: US 7,571,191 B2
(45) Date of Patent: Aug. 4, 2009

(54) DEFINING A DATA ANALYSIS PROCESS

(75) Inventors: Marcus Dill, Wiesloch (DE); Harish Hoskere Mahabal, Bangalore (IN); Torsten Bachmann, St. Leon-Rot (DE)

(73) Assignee: SAP AG, Walldorf (DE)

( * ) Notice: Subject to any disclaimer, the term of this patent is extended or adjusted under 35 U.S.C. 154(b) by 832 days.

(21) Appl. No.: 10/816,909

(22) Filed: Apr. 5, 2004

(65) Prior Publication Data

US 2005/0027683 A1    Feb. 3, 2005

Related U.S. Application Data

(63) Continuation-in-part of application No. 10/423,011, filed on Apr. 25, 2003, now abandoned.

(51) Int. Cl.
*G06F 17/30* (2006.01)
(52) U.S. Cl. .................. 707/200; 707/102; 707/101
(58) Field of Classification Search .............. 707/104.1, 707/103, 100, 10, 1, 3, 200, 102, 101
See application file for complete search history.

(56) References Cited

U.S. PATENT DOCUMENTS

| | | | |
|---|---|---|---|
| 6,049,599 A | 4/2000 | McCausland et al. | |
| 6,173,310 B1 | 1/2001 | Yost et al. | |
| 6,266,668 B1 * | 7/2001 | Vanderveldt et al. | 707/10 |
| 6,272,478 B1 * | 8/2001 | Obata et al. | 706/12 |
| 6,301,471 B1 | 10/2001 | Dahm et al. | |
| 6,385,604 B1 * | 5/2002 | Bakalash et al. | 707/3 |
| 6,430,545 B1 | 8/2002 | Honarvar et al. | |
| 6,434,568 B1 * | 8/2002 | Bowman-Amuah | 707/103 R |
| 6,442,748 B1 * | 8/2002 | Bowman-Amuah | 717/108 |
| 6,460,037 B1 | 10/2002 | Weiss et al. | |
| 6,473,757 B1 | 10/2002 | Garofalakis | |
| 6,490,585 B1 * | 12/2002 | Hanson et al. | 707/10 |
| 6,510,457 B1 | 1/2003 | Ayukawa et al. | |
| 6,636,860 B2 | 10/2003 | Vishnubhotla | |
| 6,640,244 B1 * | 10/2003 | Bowman-Amuah | 709/207 |
| 6,718,336 B1 * | 4/2004 | Saffer et al. | 707/102 |

(Continued)

FOREIGN PATENT DOCUMENTS

WO    WO03005232    1/2003

OTHER PUBLICATIONS

Chaudhuri, Surajit, et al., "An Overview of Data Warehousing and OLAP Technology," *ACM SIGMOD Record*, vol. 26, Issue 1, 1997, pp. 65-74.

*Primary Examiner*—Hosain T Alam
*Assistant Examiner*—Leon Harper
(74) *Attorney, Agent, or Firm*—Fish & Richardson P.C.

(57) ABSTRACT

A data analysis workbench enables a user to define a data analysis process that includes an extract sub-process to obtain transactional data from a source system, a load sub-process for providing the extracted data to a data warehouse or data mart, a data mining analysis sub-process to use the obtained transactional data, and a deployment sub-process to make the data mining results accessible by another computer program. Common settings used by each of the sub-processes are defined, as are specialized settings relevant to each of the sub-processes. The invention also enables a user to define an order in which the defined sub-processes are to be executed.

35 Claims, 9 Drawing Sheets

U.S. PATENT DOCUMENTS

| | | | |
|---|---|---|---|
| 6,772,034 B1* | 8/2004 | Shi et al. | 700/121 |
| 6,954,758 B1* | 10/2005 | O'Flaherty | 707/102 |
| 6,985,904 B1* | 1/2006 | Kaluskar et al. | 707/101 |
| 6,999,977 B1* | 2/2006 | Norcott et al. | 707/203 |
| 7,003,560 B1* | 2/2006 | Mullen et al. | 709/223 |
| 7,165,036 B2* | 1/2007 | Kruk et al. | 705/1 |
| 7,350,191 B1* | 3/2008 | Kompella et al. | 717/108 |
| 2002/0087806 A1* | 7/2002 | Gharachorloo et al. | 711/141 |
| 2002/0133490 A1 | 9/2002 | Conkwright | |
| 2002/0144174 A1* | 10/2002 | Nwabueze | 714/1 |
| 2002/0178159 A1* | 11/2002 | O'Brien | 707/6 |
| 2003/0018646 A1* | 1/2003 | Ohta et al. | 707/100 |
| 2003/0037025 A1* | 2/2003 | Aggarwal | 707/1 |
| 2003/0115080 A1* | 6/2003 | Kasravi et al. | 705/1 |
| 2003/0115192 A1* | 6/2003 | Kil et al. | 707/3 |
| 2003/0120477 A1* | 6/2003 | Kruk et al. | 704/2 |
| 2003/0125988 A1* | 7/2003 | Rao et al. | 705/3 |
| 2003/0130878 A1* | 7/2003 | Kruk et al. | 705/7 |
| 2003/0130996 A1* | 7/2003 | Bayerl et al. | 707/3 |
| 2003/0131007 A1* | 7/2003 | Schirmer et al. | 707/100 |
| 2003/0158702 A1* | 8/2003 | Busche et al. | 702/181 |
| 2003/0182284 A1* | 9/2003 | Russell | 707/6 |
| 2003/0191727 A1* | 10/2003 | Yao et al. | 706/20 |
| 2003/0212789 A1 | 11/2003 | Hamel et al. | |
| 2004/0002961 A1 | 1/2004 | Dettinger | |
| 2004/0122790 A1 | 6/2004 | Walker et al. | |
| 2004/0128204 A1 | 7/2004 | Cihla et al. | |
| 2004/0164961 A1* | 8/2004 | Bal et al. | 345/163 |
| 2004/0210579 A1 | 10/2004 | Dettinger | |
| 2004/0215501 A1 | 10/2004 | d'Ornano | |
| 2004/0215522 A1 | 10/2004 | Eder | |
| 2004/0215695 A1* | 10/2004 | Hsu et al. | 709/201 |

\* cited by examiner

| Customer Number | Age | First Purchase | Most Recent Purchase | Region | Income Level | Likelihood of Churn |
|---|---|---|---|---|---|---|
| 2002-0345 | 25 | 01-2002 | 01-2002 | NE | 1 | 80% |
| 1999-8754 | 45 | 06-1999 | 06-2001 | SW | 2 | 60% |
| 1997-9575 | 31 | 07-1997 | 07-2003 | NE | 5 | 40% |
| 1986-8884 | 60 | 09-1986 | 09-2002 | SW | 7 | 20% |

FIG. 2

DEFINING A DATA ANALYSIS PROCESS

CROSS REFERENCE TO RELATED APPLICATION

This application is a continuation-in-part of U.S. application Ser. No. 10/423,011, filed Apr. 25, 2003 now abandoned, and titled "Automated Data Mining Runs," which is incorporated by reference in its entirety.

TECHNICAL FIELD

This description relates to loading and using data in a data warehouse on a computer system.

BACKGROUND

Computer systems often are used to manage and process business data. To do so, a business enterprise may use various application programs running on one or more computer systems. Application programs may be used to process business transactions, such as taking and fulfilling customer orders, providing supply chain and inventory management, performing human resource management functions, and performing financial management functions. Data used in business transactions may be referred to as transaction data, transactional data or operational data. Often, transaction processing systems provide real-time access to data, and such systems may be referred to as on-line transaction processing (OLTP) systems.

Application programs also may be used for analyzing data, including analyzing data obtained through transaction processing systems. In many cases, the data needed for analysis may have been produced by various transaction processing systems and may be located in many different data management systems. A large volume of data may be available to a business enterprise for analysis.

When data used for analysis is produced in a different computer system than the computer system used for analysis or when a large volume of data is used for analysis, the use of an analysis data repository separate from the transaction computer system may be helpful. An analysis data repository may store data obtained from transaction processing systems and used for analytical processing. The analysis data repository may be referred to as a data warehouse or a data mart. The term data mart typically is used when an analysis data repository stores data for a portion of a business enterprise or stores a subset of data stored in another, larger analysis data repository, which typically is referred to as a data warehouse. For example, a business enterprise may use a sales data mart for sales data and a financial data mart for financial data.

Analytical processing may be used to analyze data stored in a data warehouse or other type of analytical data repository. When an analytical processing tool accesses the data warehouse on a real-time basis, the analytical processing tool may be referred to as an on-line analytical processing (OLAP) system. An OLAP system may support complex analyses using a large volume of data. An OLAP system may produce an information model using a three-dimensional presentation, which may be referred to as an information cube or a data cube.

One type of analytical processing identifies relationships in data stored in a data warehouse or another type of data repository. The process of identifying data relationships by means of an automated computer process may be referred to as data mining. Sometimes a data mining mart may be used to store a subset of data extracted from a data warehouse. A data mining process may be performed on data in the data mining mart, rather than the data mining process being performed on data in the data warehouse. The results of the data mining process then are stored in the data warehouse. The use of a data mining mart that is separate from a data warehouse may help decrease the impact on the data warehouse of a data mining process that requires significant system resources, such as processing capacity or input/output capacity. Also, data mining marts may be optimized for access by data mining analyses that provide faster and more flexible access.

One type of data relationship that may be identified by a data mining process is an associative relationship in which one data value is associated or otherwise occurs in conjunction with another data value or event. For example, an association between two or more products that are purchased by a customer at the same time may be identified by analyzing sales receipts or sales orders. This may be referred to as a sales basket analysis or a cross-selling analysis. The association of products purchases may be based on a pairing of two products, such as when a customer purchases product A, the customer also purchases product B. The analysis may also reveal relationships between three products, such as when a customer purchases product A and product B, the customer also typically purchases product C. The results of a cross-selling analysis may be used to promote associated products, such as through a marketing campaign that promotes the associated products or by locating the associated products near one another in a retail store, such as by locating the products in the same aisle or shelf.

Customers that are at risk of not renewing a sales contract or not purchasing products in the future also may be identified by data mining. Such an analysis may be referred to as a churn analysis in which the likelihood of churn refers to the likelihood that a customer will not purchase products or services in the future. A customer at risk of churning may be identified based on having similar characteristics to customers that have already churned. The ability to identify a customer at risk of churning may be advantageous, particularly when steps may be taken to reduce the number of customers who do churn. A churn analysis may also be referred to as a customer loyalty analysis.

For example, in the telecommunications industry a customer may be able to switch from one telecommunication provider to another telecommunications provider relatively easily. A telecommunications provider may be able to identify, using data mining techniques, particular customers that are likely to switch to a different telecommunications provider. The telecommunications provider may be able to provide an incentive to at-risk customers to decrease the number of customers who switch.

In general, using data for special data analysis, such as the application of data mining techniques, involves a fixed sequence of processes, in which each process occurs only after the completion of a predecessor process. For example, in a data warehouse that uses a separate data mining mart for the performance of a data mining process, three processes may need to be performed in order. First, data must be loaded to a data warehouse from a transaction data management system. Second, data from the data warehouse must be copied to a data mining mart and the data mining process must be performed. Third, the enriched or new data that results from the data mining process must be loaded to the data warehouse.

Computer-aided software engineering facilities may be used for designing computer programs and modeling data. Computer-aided facilities also may be used for defining data integration application programs and for defining how data from one system is mapped to data in another system.

SUMMARY

Generally, the invention enables a user to define a data analysis process that includes an extract sub-process to obtain transactional data from a source system, a load sub-process for providing the extracted data to a data warehouse or data mart, a data mining analysis sub-process to use the obtained transactional data, and a deployment sub-process to make the data mining results accessible by another computer program, such as a customer relationship management system or a business analytics system. Common settings used by each of the sub-processes are defined, as are specialized settings relevant to each of the sub-processes. The invention also enables a user to define an order in which the defined sub-processes are to be executed. The invention also enables the use of a central monitoring function that provides a common approach to generating messages that provide status information related to each of sub-process.

In one general aspect, a graphical user interface is generated for using a computer to display and modify a data analysis process. The graphical user interface includes a process list display for displaying identifications of data analysis processes, and receiving an entry of an identification of a data analysis process. The graphical user interface also includes a data analysis display for displaying a representation of each sub-process included in the data analysis process identified by the received entry, and displaying a connection between each displayed sub-process. The data analysis display is able to display a data mining sub-process for creating a data attribute by performing an analytical process on data from an analytical processing data source. The data analysis display also is able to display one or more of sub-processes of (1) an extraction sub-process for extracting data from a data source, (2) a transformation sub-process for transforming the extracted data from a data format used by the data source to a data format used for analytical processing, (3) a loading sub-process for loading data into the data source used for analytical processing, and (4) a deployment sub-process for storing the created data attribute.

Implementations may include one or more of the following features. For example, the deployment sub-process may store the created data attribute in one of the data source, a transactional data store other than the data source, or a second analytical data store used for analytical processing. Each type of the sub-processes displayed in the data analysis process display may be represented by a different shape than other shapes representing types of sub-processes displayed in the analysis sub-process display.

The graphical user interface may include controls for adding types of sub-processes to the data analysis process displayed in the data analysis display. The controls may include a control for adding an extraction sub-process, a control for adding a load sub-process, a control for adding an analysis sub-process, and a control for adding a deployment sub-process. The graphical user interface also may include a control for displaying information about the status of the data analysis process.

In another general aspect, a graphical user interface generated on a display device for using a computer to define a data analysis process includes a sub-processes display for (1) receiving an entry of an identification of which of sub-processes are included in the data analysis process and (2) receiving an entry identifying a computer program to be associated with each of the identified sub-processes such that the execution of the computer program causes the identified sub-process to be performed. The sub-processes to be included are one or more of (1) an extraction sub-process for extracting data from a data source, (2) a transformation sub-process for transforming the extracted data from a data format used by the data source to a data format used for analytical processing, (3) a loading sub-process for loading data into a data source that is used for analytical processing, (4) a data mining sub-process for creating a data attribute by performing an analytical process on data from the analytical processing data source, and (5) an deployment sub-process for storing the created data attribute. The graphical user interface also includes a common data display for receiving an entry of selected meta-data elements to be used in the data analysis process. Each meta-data element is associated with a corresponding data element in the data source and with a corresponding data element in the analytical processing data source.

Implementations may include one or more of the features noted above and one or more of the following features. For example, the data source may be a transactional data source, and the deployment sub-process may store the created data attribute in the transactional data source.

The graphical user interface may be able to receive an input defining how a particular error is to be processed during the data analysis process, receive an input identifying a computing device or a component of a computing device to be used during the execution of one of the identified sub-processes, receive an input identifying an order in which each of the identified sub-processes are to be performed, or receive an input identifying when the data analysis process is to be initiated.

In yet another general aspect, information is received from a user for use in a data analysis process. An input identifying a data analysis process, as are sub-process inputs. Each sub-process input identifies a sub-process associated with the data analysis process. At least one of the identified sub-processes is (1) an extraction sub-process for extracting data from a transactional data source, (2) a transformation sub-process for transforming data extracted from the transactional data source from a data format used by the transactional data source to a data format used for analytical processing, (3) a loading sub-process for loading data into an analytical data source that is used for analytical processing, or (4) a data mining sub-process for creating a data attribute by performing an analytical process on data from the analytical processing data source. At least one of the identified sub-processes is a deployment sub-process for storing a data attribute created in another of the identified sub-processes. The input identifying the data analysis process is stored in association with the inputs identifying the multiple sub-processes for use in the data analysis process.

Implementations may include one or more of the features noted above and one or more of the following features. For example, one of the sub-process inputs may be a sub-process input identifying a computer program that causes the identified sub-process to be performed.

Inputs of meta-data elements to be used in the data analysis process may be received. Each meta-data element may be associated with 1) a corresponding data element in the transactional data source, 2) a corresponding data element in the analytical process data source, or 3) both a corresponding data element in one of the transactional data sources and a corresponding data element in the analytical process data source.

Each of the multiple sub-processes use a common message format. An input may be received to define how a particular error is to be processed during the data analysis process, identify a computing device or a component of a computing device to be used during the execution of one of the multiple sub-processes, identify an order in which the multiple sub-processes are to be performed, identify when the data analysis process is to be initiated.

The identified sub-processes may include a first deployment sub-process for storing a data attribute created in another of the identified sub-processes in a first data store and a second deployment sub-process for storing the data attribute in a second data store. The first data store may be the same as, or different from, the second data store. The first data store may be a transactional data store and the second data store may be an analytical data store.

Implementations of any the techniques discussed above may include a method or process, a system or apparatus, or computer software on a computer-accessible medium. The details of one or more implementations of the invention are set forth in the accompanying drawings and the description below. Other features, objects, and advantages of the invention will be apparent from the description and drawings, and from the claims.

DESCRIPTION OF DRAWINGS

FIG. 2 is a block diagram illustrating the enrichment of data stored in the data warehouse based on a data analysis process developed using a data analysis workbench.

DETAILED DESCRIPTION

Figure 1:
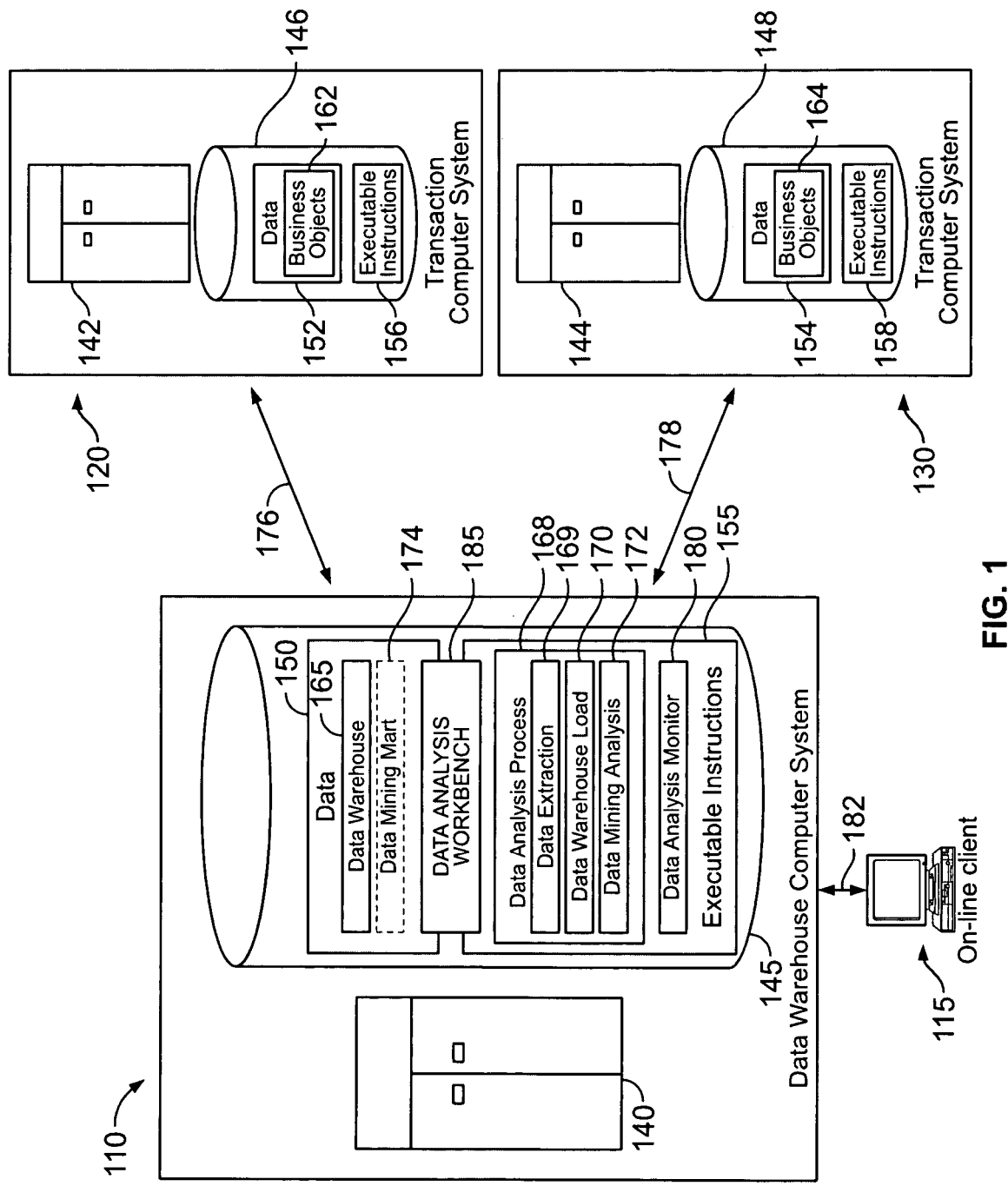
FIG. 1 is a block diagram of a system incorporating various aspects of the invention.

FIG. 1 shows a block diagram of a system 100 of networked computers, including a computer system 110 for a data warehouse and transaction computer systems 120 and 130. A data analysis process directs and manages the loading of new data to the data warehouse 110 from the transaction computer systems 120 and 130 and triggers a special analysis to enrich the newly loaded data with new attributes.

The system 100 includes a computer system 110 for a data warehouse, a client computer 115 used to administer the data warehouse, and transaction computer systems 120 and 130, all of which are capable of executing instructions on data. As is conventional, each computer system 110, 120 or 130 includes a server 140, 142 or 144 and a data storage device 145, 146 or 148 associated with each server. Each of the data storage devices 145, 146 and 148 includes data 150, 152 or 154 and executable instructions 155, 156 or 158. A particular portion of data, here referred to as business objects 162 or 164, is stored in computer systems 120 and 130, respectively. Each of business objects 162 or 164 includes multiple business objects. Each business object in business objects 162 or 164 is a collection of data attribute values, and typically is associated with a principal entity represented in a computing device or a computing system. Examples of a business object include information about a customer, an employee, a product, a business partner, a product, a sales invoice, and a sales order. A business object may be stored as a row in a relational database table, an object instance in an object-oriented database, data in an extensible mark-up language (XML) file, or a record in a data file. Attributes are associated with a business object. In one example, a customer business object may be associated with a series of attributes including a customer number uniquely identifying the customer, a first name, a last name, an electronic mail address, a mailing address, a daytime telephone number, an evening telephone number, date of first purchase by the customer, date of the most recent purchase by the customer, birth date or age of customer, and the income level of customer. In another example, a sales order business object may include a customer number of the purchaser, the date on which the sales order was placed, and a list of products, services, or both products and services purchased.

The data warehouse computer system 110 stores a particular portion of data, here referred to as data warehouse 165. The data warehouse 165 is a central repository of data, extracted from transaction computer system 120 or 130 such as business objects 162 or 164. The data in the data warehouse 165 is used for special analyses, such as data mining analyses used to identify relationships among data. The results of the data mining analysis also are stored in the data warehouse 165.

The data warehouse computer system 110 includes a data analysis process 168 having a data extraction sub-process 169, a data warehouse load sub-process 170 and a data mining analysis sub-process 172. The data extraction sub-process 169 includes executable instructions for extracting and transmitting data from the transaction computer systems 120 and 130 to the data warehouse computer system 110. The data warehouse load sub-process 170 includes executable instructions for loading data from the transaction computer systems 120 and 130 to the data warehouse computer system 110. The data mining analysis sub-process 172 includes executable instructions for performing a data mining analysis in the data warehouse computer system 110, and enriching the data in the data warehouse 165 with new attributes determined by the data mining analysis, as described more fully below.

In some implementations, the data warehouse computer system 110 also may include a data mining mart 174 that temporarily stores data from the data warehouse 165 for use in data mining. In such a case, the data mining analysis sub-process 172 also may extract data from the data warehouse 165, store the extracted data to the data mining mart 174, perform a data mining analysis that operates on the data from the data mining mart 174, and enrich the data in the data warehouse 165 with the new attributes determined by the data mining analysis.

The data warehouse computer system 110 is capable of delivering and exchanging data with the transaction computer systems 120 and 130 through a wired or wireless communication pathway 176 and 178, respectively. The data warehouse computer system 110 also is able to communicate with the on-line client 115 that is connected to the computer system 110 through a communication pathway 176.

The data warehouse computer system 110, the transaction computer systems 120 and 130, and the on-line client 115 may be arranged to operate within or in concert with one or more other systems, such as, for example, one or more LANs ("Local Area Networks") and/or one or more WANs ("Wide Area Networks"). The on-line client 115 may be a general-purpose computer that is capable of operating as a client of the application program (e.g., a desktop personal computer, a workstation, or a laptop computer running an application program), or a more special-purpose computer (e.g., a device specifically programmed to operate as a client of a particular application program). The on-line client 115 uses communication pathway 182 to communicate with the data warehouse computer system 110. For brevity, FIG. 1 illustrates only a single on-line client 115 for system 100.

At predetermined times, the data warehouse computer system 110 initiates a data analysis process. This may be accomplished, for example, through the use of a task scheduler (not shown) that initiates the data analysis process at a particular day and time. In general, the data analysis process uses the data extraction sub-process 169 to extract data from the source systems 120 and 130, uses the data warehouse load sub-process 170 to transform and load the extracted data to the data warehouse 165, and uses the data mining analysis sub-process 172 to perform a data mining run that creates new attributes by performing a special analysis of the data and loads the new attributes to the data warehouse 165. A particular data mining run may be scheduled as a recurring event based on the occurrence of a predetermined time or date (such as the first day of a month, every Saturday at one o'clock a.m., or the first day of a quarter). Examples of data analysis processes are described more fully in FIGS. 3-5.

More specifically, the data warehouse computer system 110 uses the data analysis process 168 to initiate the extraction sub-process 169, which extracts or copies a portion of data, such as all or some of business objects 162, from the data storage 146 of the transaction computer system 120. The extracted data is transmitted over the connection 176 to the data warehouse computer system 110. The data warehouse computer system 110 then uses the data analysis process 168 to initiate the data warehouse upload sub-process 170 to store the extracted data in the data warehouse 165. The data warehouse computer system 110 also may transform the extracted data from a format suitable to computer system 120 into a different format that is suitable for the data warehouse computer system 110. Similarly, the data warehouse computer system 110 may extract a portion of data from data storage 154 of the computer system 130, such as all or some of business objects 164, transmit the extracted data over connection 178, store the extracted data in the data warehouse 165, and optionally transform the extracted data.

After the data have been extracted from the source computer systems (here, transaction computer systems 120 and 130), optionally transformed, and loaded into the data warehouse 165, the data analysis process 168 initiates the data mining analysis sub-process 172. The data mining analysis sub-process 172 performs a particular data mining procedure to analyze data from the data warehouse 165, enrich the data with new attributes, and store the enriched data in the data warehouse 165. A particular data mining procedure also may be referred to as a data mining run. There are different types of data mining runs. A data mining run may be a training run in which data relationships are determined, a prediction run that applies a determined relationship to a collection of data relevant to a future event, such as a customer failing to renew a service contract or make another purchase, or both a training run and a prediction run. The prediction run results in the creation of a new attribute for each business object in the data warehouse 165. The creation of a new attribute may be referred to as data enrichment. For example, when the data mining run predicts the likelihood that each customer will churn, an attribute for the likelihood of churn for each customer is stored in the data warehouse 165. That is, the data warehouse 165 is enriched with the new attribute. In some implementations, the data mining analysis sub-process 172 may be automatically triggered by the presence of new data in the data warehouse or after the completion of the data warehouse load sub-process 170.

The combination of the data warehouse extraction sub-process 169, the data warehouse load sub-process 170 and the data mining analysis sub-process 172 in the data analysis process 168 may increase the coupling of the sub-processes, which, in turn, may enable the use of the same monitoring process to monitor the extraction sub-process 169, the data warehouse load sub-process 170 and the data mining analysis sub-process 172, which, in turn, may help simplify the monitoring of the data analysis process 168.

The data warehouse computer system 110 also includes a data analysis monitor 180 that reports on the execution of the data analysis process 168. For example, an end user of online client 115 is able to view when a data analysis process is scheduled to next occur, the frequency or other basis on which the data analysis process is scheduled, and the status of the data analysis process. For example, the end user may be able to determine that the data analysis process 168 is executing. When the data analysis process 168 is executing, the end user may be able to view the progress and status of each of the sub-processes. For example, the end user may be able to view the time that the data warehouse upload process 168 was initiated. The monitoring process returns one of three results for each sub-process (or step of a sub-process) being monitored: (1) an indication that the sub-process (or step of a sub-process) is running, (2) an indication that the sub-process (or step of a sub-process) has successfully completed, and (3) an indication that the sub-process (or step of a sub-process) failed to successfully complete. When the sub-process (or step of a sub-process) has failed, additional information may be available, such as whether the sub-process (or step of a sub-process) unexpectedly terminated or that warning messages are associated with the sub-process (or step of a sub-process). Examples of a warning message include messages related to data inconsistency. One example of a data inconsistency occurs when a gender data element includes a value other than permitted values of "male," "female" or "unknown."

In some implementations, the monitor process may initiate a computer program to try to correct the data. In the above example of the gender data element, a computer program may set the value of the gender data element to "unknown" when a value for the gender data element is other than "male," "female" or "unknown."

The ability to monitor the execution of the data analysis process may be useful to ensure that the data analysis process 168 is operating as desired. In some implementations, when a problem is detected in the data analysis process, a notification of the problem may be sent to an administrator for the data warehouse or other type of end user.

The use of the data warehouse monitor 180 with the data extraction sub-process 169, the data load sub-process 170 and the data mining analysis sub-process 172 may be advantageous. For example, a system administrator or another type of user need only access a single monitoring process (here, data warehouse monitor 180) to monitor all of the sub-processes (here, the data extraction sub-process 169, the data load sub-process 170 and the data mining analysis sub-process 172). The use of the same monitoring process for different sub-processes may result in consistent process behavior across the different sub-processes. For example, the monitoring process may enable the use of a consistent message format or protocol across sub-processes. This, in turn, may enable a sub-process to receive, process, and act on messages sent from another sub-process. In one example, a load sub-process may detect incomplete data values in some attributes to be loaded and, in response, send to a data mining sub-process a message indicating the incompleteness of the data. The data mining sub-process then may be able to, in response to the message, trigger appropriate pre-processing of the data to complete the necessary data values. The use of the same monitoring process also may reduce the amount of training required for system administrators to be able to use the data warehouse monitor 180.

The data analysis monitor 180 may include a variety of mechanisms by which an alert or other type of message may be sent to a user. Examples of such alert mechanisms include electronic mail messages, short message service (SMS) text messages or another method of sending text messages over a voice or data network to a mobile telephone, and messages displayed or printed during a log-on or sign-on process. In some implementations, a user may be able to select one or more alert mechanisms by which the user prefers to receive messages from the data analysis monitor 180.

The data analysis monitor 180 also may include a results-based alerting function in which the data analysis monitor 180 detects whether results of a data analysis process are noteworthy. For example, a data analysis process, on a weekly basis, may extract and load sales orders from a CRM system and analyzed for new or interesting cross-selling rules. The results may be automatically compared over time in the data analysis process. A message may be sent by the data analysis monitor 180 when significant changes are detected. The data analysis monitor 180 also may be capable of automated error handling in which a user is able to define rules for how to proceed when particular errors are generated.

The data analysis monitor 180 also may inform a user when a sub-process has been completed and wait for confirmation by the user before proceeding to initiate the next sub-process. By way of example, the data analysis monitor 180 may detect when results of a data analysis sub-process fall outside a predetermined threshold and, as a result, interrupt the data analysis process after the completion of the data analysis sub-process that produced the results outside of the threshold. The data analysis monitor 180 may then only proceed with the deployment sub-process to provide the results to a transaction computer system after receiving confirmation from a user that the deployment is to proceed.

The data warehouse computer system 110 also includes a data analysis workbench 185 for defining the data extraction sub-process 169, the data warehouse upload sub-process 170 and the data mining analysis sub-process 172, as described more fully later. The data analysis workbench is a computer program that provides a user interface for assisting a user in the development of a data analysis process. The data analysis workbench 195 also enables a user to specify the order in which the extraction sub-process 169, the data warehouse load sub-process 170 and the data mining analysis sub-process 172 are executed.

The data analysis workbench 185 may use the previously-described meta-data across sub-processes, as described more fully later. This may help improve the consistency of the data analysis process. In addition, the use of meta-data in different sub-processes may help enable the use of reusable components in different sub-processes. By way of example, currency conversion could be performed using the same function in all sub-processes of a data analysis process that require a current conversion function.

The data analysis workbench 185 also may be able to distribute different sub-processes across various processors or other types of computer devices or components to help balance the work load across multiple components. In some implementations, assignment of particular sub-processes, or aspects of sub-processes, to particular computer devices or components may be enabled by the data analysis workbench during the definition of the data analysis process.

The ability to define the data extraction sub-process 169, the data warehouse load sub-process 170 and the data mining analysis sub-process 172 in a workbench may be useful. For example, the organizational training costs, support costs, and system resource costs may be reduced when a single workbench is used, as compared with the costs associated with using separate software tools to define the sub-processes 169-171. Additionally, the number of errors generated during development of sub-processes 169-171 should be reduced when a user is able to define sub-processes 169-171 together, at the same time, using the same tool, as compared with the number of errors generated during the development of separate sub-processes at different times using different tools. Also, the data analysis workbench 185 may be able to provide additional error checking as compared with the error checking provided by using separate software tools for defining sub-processes 169-171. For example, the data analysis workbench may be able to provide automated support for the coupling of the extraction sub-process 169 and the data warehouse load sub-process 170 with the data mining analysis sub-process 172. Thus, the data analysis workbench may help to reduce the total cost of ownership of data analysis applications.

In some implementations, the data analysis workbench 185 may be implemented on a computer system that is different from a data warehouse computer system. For example, the data analysis workbench 185 may be implemented on a computer system used for developing computer programs. FIG. 2 shows the results 200 of enriching the data stored in the data warehouse based on an data analysis process. The results 200 are stored in a relational database system that logically organizes data into a database table. The database table arranges data associated with an entity (here, a customer) in a series of columns 210-216 and rows 220-223. Each column 210, 211, 212, 213, 214, 215, or 216 describes an attribute of the customer for which data is being stored. Each row 220, 221, 222 or 223 represents a collection of attribute values for a particular customer number by a customer identifier 210. The attributes 210-215 were extracted from a source system, such as a customer relationship management system, and loaded into the data warehouse. The attribute 216 represents the likelihood of churn for each customer 220, 221, 222 and 223. The likelihood-of-churn attribute 216 was created and loaded into the data warehouse by an data analysis process, such as the data analysis process described in FIGS. 1, 3 and 4.

Figure 3:
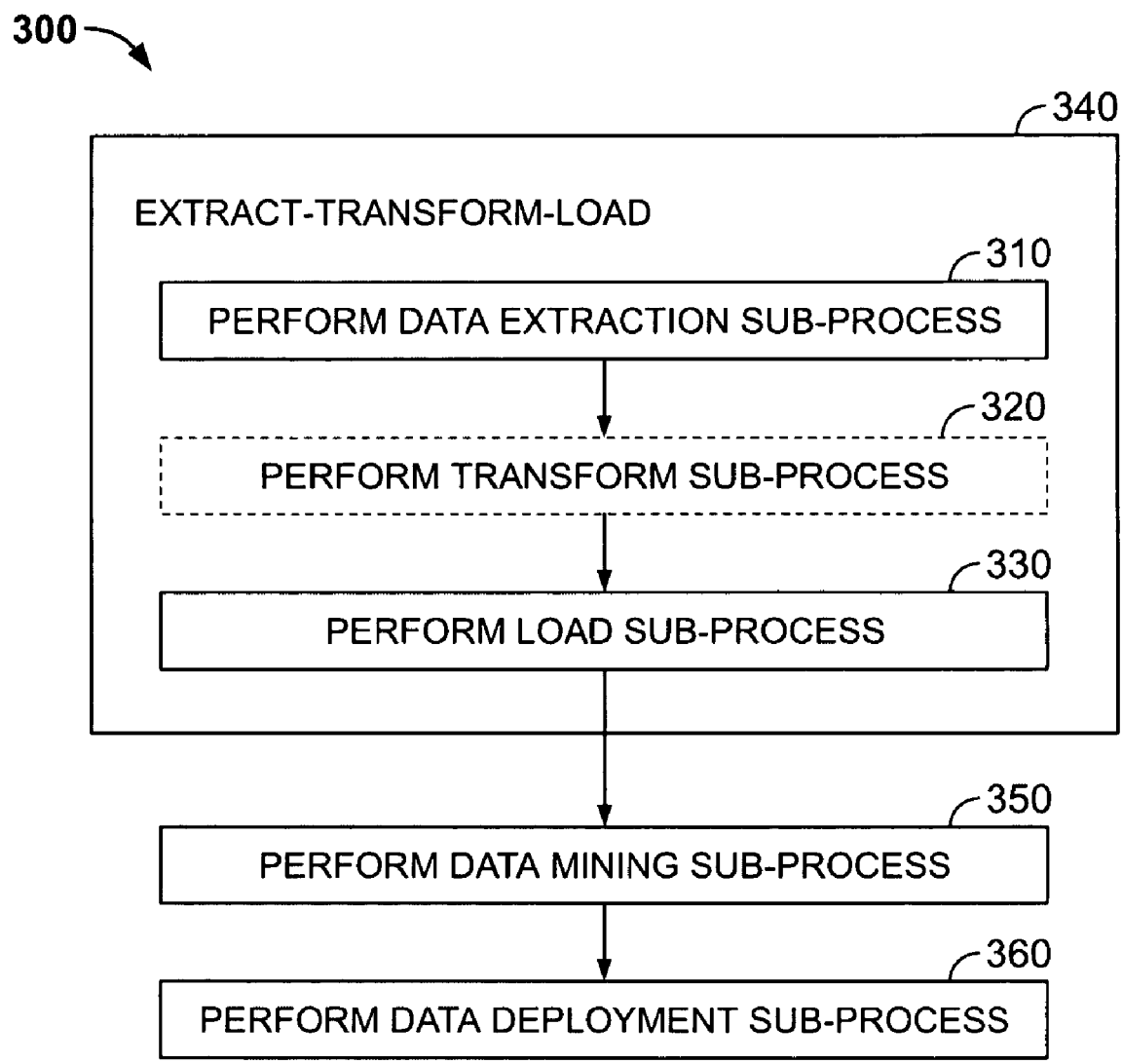
FIGS. 3 and 4 are flow charts of data analysis processes developed using a data analysis workbench.

FIG. 3 illustrates a data analysis process 300 developed using a data analysis workbench. The data analysis process 300 may be performed by a processor on a computing system, such as data warehouse computer system 110 of FIG. 1. The data analysis processor is directed by a method, script, or other type of computer program that includes executable instructions for performing the data analysis process 300. An example of such a collection of executable instructions is the data analysis process 168 of FIG. 1.

The data analysis process 300 includes a data extraction sub-process 310, an optional transform sub-process 320, and a load sub-process 330 that, collectively, may be referred to as an extraction-transform-load or "ETL" sub-process 340. The data analysis process 300 also includes a data mining sub-process process 350 and a data enrichment sub-process 360. The data analysis process 300 begins at a predetermined time and date, typically a recurring predetermined time and date. In some implementations, a system administrator or another type of user may manually initiate the data analysis process 300.

For example, a churn management data analysis process may be associated with a script that includes a remote procedure call to extract data from one or more source systems in step 310, a computer program to transform the extracted data, a database script for loading the data warehouse with the transformed data, and a computer program to perform a churn analysis on the customer data in the data warehouse. Thus, once the script for the churn management data analysis process has been initiated, by a task scheduler or other type of computer program, the tasks are then automatically triggered based on the completion of the previous script component.

The data warehouse processor, in a data extraction sub-process, extracts from a source system appropriate data and transmits the extracted data to the data warehouse (step 310). For example, the data warehouse processor may execute a remote procedure call on the source system to trigger the extraction and transmission of data from the source system to the computer system on which the data warehouse resides. Alternatively, the data warehouse processor may connect to a web service on the source system to request the extraction and transmission of the data. Typically, the data to be extracted is data from a transaction system, such as an OLTP system. The data extracted may be a complete set of the appropriate data (such as all sales orders or all customers) from the source system, or may be only the data that has been changed since the last extraction. The processor may extract and transmit the data from the source system in a series of data groups, such as data blocks. The extraction may be performed either as a background process or an on-line process, as may the transmission. The ability to extract and transmit data in groups, extract and transmit only changed data, and extract and transmit as a background process may collectively or individually be useful, particularly when a large volume of data is to be extracted and transmitted.

In some implementations, the extracted data also may be transformed, in a transform sub-process, from the format used by the source system to a different format used by the data warehouse (step 320). The data transformation may include transforming data values representing a particular attribute to a different field type and length that is used by the data warehouse. The data transformation also may include translating a data code used by the source system to a corresponding but different data code used by the data warehouse. For example, the source system may store a country value using a numeric code (for example, a "1" for the United States and a "2" for the United Kingdom) whereas the data warehouse may store a country value as a textual abbreviation (for example, "U.S." for the United States and "U.K." for the United Kingdom). The data transformation also may include translating a proprietary key numbering system in which primary keys are created by sequentially allocating numbers within an allocated number range to a corresponding GUID ("globally unique identifier") key that is produced from a well-known algorithm and is able to be processed by any computer system using the well-known algorithm. The processor may use a translation table or other software engineering or programming techniques to perform the transformations required. For example, the processor may use a translation table that translates the various possible values from one system to another system for a particular data attribute (for example, translating a country code of "1" to "U.S." and "2" to "U.K." or translating a particular proprietary key to a corresponding GUID key).

Other types of data transformation also may be performed by the data warehouse processor. For example, the processor may aggregate data or generate additional data values based on the extracted data. For example, the processor may determine a geographic region for a customer based on the customer's mailing address or may determine the total amount of sales to a particular customer that is associated with multiple sales orders.

The data warehouse processor, in a load sub-process, loads the extracted data into data storage associated with the data warehouse, such as the data warehouse 165 of FIG. 1 (step 330). The data warehouse processor may execute a computer program having executable instructions for loading the extracted data into the data storage and identified by the data analysis method directing the process 300. For example, a database script may be executed that includes database commands to load the data to the data warehouse. The use of a separate computer program for loading the data may increase the modularity of the data mining method, which, in turn, may improve the efficiency of modifying the data analysis process 300.

After completing the ETL sub-process 340, the data warehouse processor performs a data mining sub-process (step 350). To do so, the data warehouse processor may apply a data mining model or another type of collection of data mining rules that defines the type of analysis to be performed. The data mining model may be applied to all or a portion of the data in the data warehouse. In some implementations, the data warehouse processor may store the data to be used in the data mining run in transient or persistent storage peripheral to the data warehouse processor where the data is accessed during the data mining run. This may be particularly advantageous when the data warehouse includes a very large volume of data and/or the data warehouse also is used for OLAP processing. In some cases, the storage of the data to transient or persistent storage may be referred to as extracting or staging the data to a data mart for data mining purposes.

The data mining run may be a training run or a prediction run. In some implementations, both a training run and a prediction run may be performed during process 300. The results of the data mining run are stored in temporary storage. In one example, in a customer churn analysis data mining process, the likelihood of churn for each customer may be assessed and stored in a temporary results data structure.

When the data mining sub-process 350 is completed, the data warehouse processor performs a deployment sub-process to store, or otherwise make accessible to other executable computer programs, the data created by the data mining sub-process (step 360). In some implementations, a distinction is made between a deployment sub-process that makes data mining results accessible to a transaction computer system and a data enrichment sub-process that makes data mining results accessible to a data warehouse or data mart used for analysis purposes. Making the data mining results available may require the addition of a new column to a database table or the addition of a new attribute to a object for storage of data mining results.

In one example of a data deployment sub-process, the data warehouse processor sends the data mining results for storage in a transaction computer system. To do so, in one example, a new column for the data mining results may be added to a table in a relational data management system being used for the the transaction computer system. In a customer churn analysis data mining process, the likelihood of churn for each customer may be added as a new attribute in the data warehouse and appropriately populated with the likelihood data generated when the data mining sub-process was performed in step 350.

In one example, the process 300 may be used for an automated customer-churn data analysis process. A system administrator develops computer programs, each of which are executed to accomplish a portion of the automated customer-churn data analysis process. The system administrator also develops a script that identifies each of the computer programs to be executed and the order in which the computer programs are to be executed to accomplish the automated customer-churn data analysis process. The system administrator, using a task scheduling program schedules the automated customer-churn data mining script to be triggered on a monthly basis, such as on the first Saturday of each month and beginning at one o'clock a.m.

At the scheduled time, the task scheduling program triggers the data warehouse processor to execute the automated customer-churn data mining script. The data warehouse processor executes a remote procedure call in a customer relationship management system to extract customer data and transmit the data to the data warehouse computer system. The data warehouse computer system receives and stores the extracted customer data. The data warehouse processor executes a computer program, as directed by the executing automated customer-churn data analysis process script, to transform the customer data to a format usable by the data warehouse.

The data warehouse processor continues to execute the automated customer-churn data analysis process script, which then triggers a data mining training run to identify hidden relationships within the customer data. Specifically, the characteristics of customers who have not renewed a service contract in the last eighteen months are identified. The characteristics identified may include, for example, an income above or below a particular level, a geographic region in which the non-returning customer resides, the types of service contract that were not renewed, and the median age of a non-renewing customer.

The data warehouse processor then, under the continued direction of the automated customer-churn analysis mining process script, triggers a data mining prediction run to identify particular customers who are at risk of not renewing a service contract, the prediction is made based on the customer characteristics identified in the data mining training run. The data warehouse processor determines a likelihood-of-churn for each customer. The data warehouse is enriched with the likelihood-of-churn for each customer such that a likelihood-of-churn attribute is added to the customer data in the data warehouse and the likelihood-of-churn value for each value is stored in the new attribute.

In some implementations, when a subsequent likelihood-of-churn value for a customer is determined, such as a likelihood-of-churn value for a customer that is determined in the following month, the likelihood-of-churn value from the previous data mining prediction run may be replaced so that a customer has only one likelihood-of-churn value at any time. In contrast, some implementations may store the new likelihood-of-churn value each month, in addition to a previous value for the likelihood-of-churn, to develop a time-dependent prediction—that is, a new prediction for the same type of prediction is stored each time a prediction run is performed for a customer. The time-dependent prediction may help improve the accuracy of the data mining training runs because the predicted values may be monitored over time and compared with actual customer behavior.

In some implementations, the data mining results are first sent to a data warehouse. The data warehouse then sends the data mining results to a transaction computer system, such as a customer relationship management system.

In some implementations, the data mining results may include business analysis rules or models that may be provided to a transaction computer system or a data warehouse. By way of example, a data mining sub-process may generate a scoring function that may be deployed to a CRM system for use in an on-line calculation of a customer loyalty score or likelihood-to-churn score for a particular customer, such as when a customer calls into a call center to place an order, make an inquiry or obtain technical support for a product. In another example, a data mining sub-process may identify a rule to define a target group of customers for a marketing campaign, such as customers with a likelihood-to-churn score lower than a specified value. A deployment sub-process may use the rule to send an electronic mail message or other type of text message to each customer with scores lower than the specified value.

Figure 4:
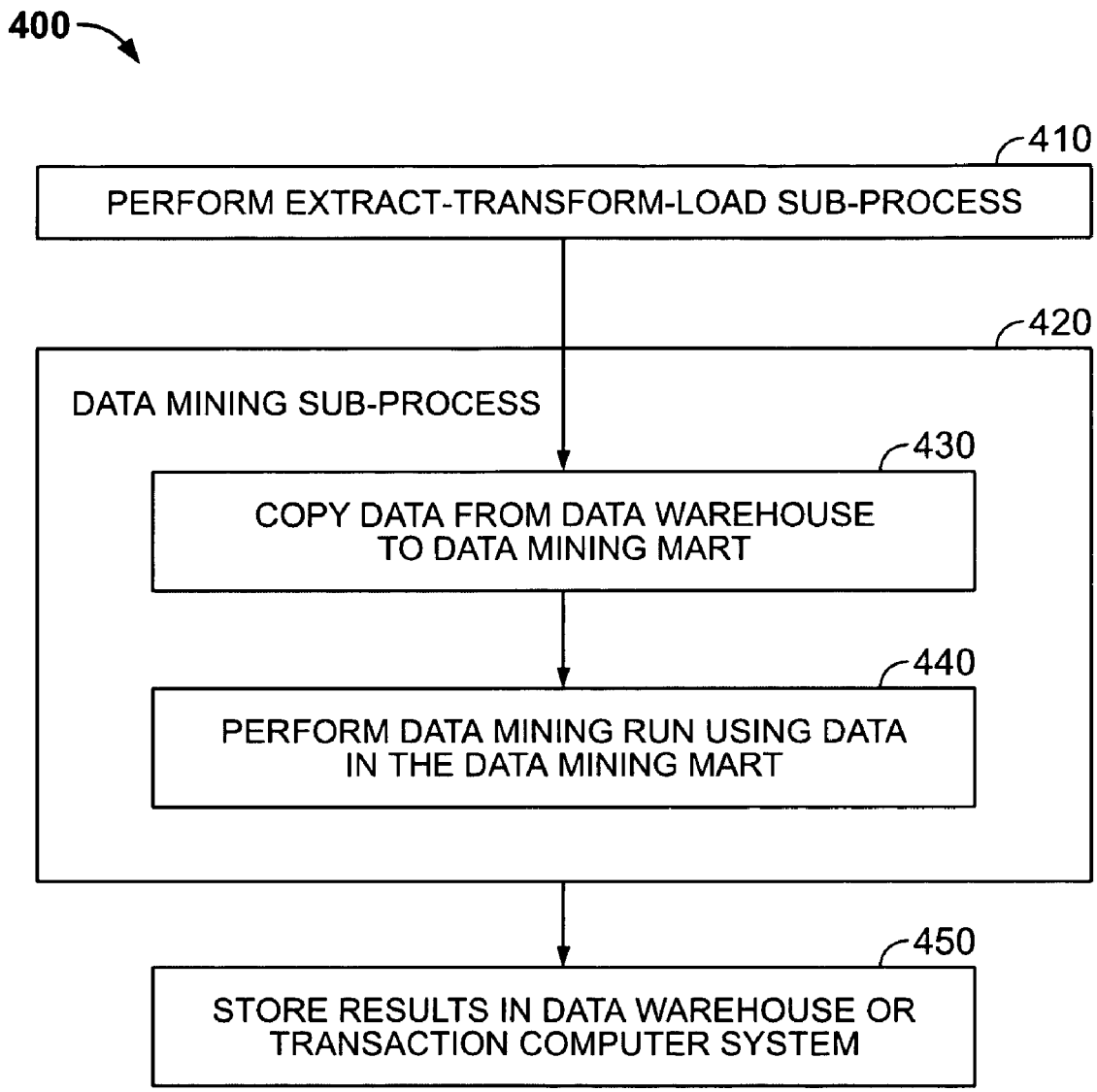

FIG. 4 illustrates another example of an data analysis process 400 developed using a data analysis workbench. In contrast to the data analysis process 300 of FIG. 3, data analysis process 400 replicates data from a data warehouse, such as data warehouse 165 in FIG. 1, to a data mining mart, such as data mining mart 174 of FIG. 1. The data mining process 400 then performs the data mining analysis on data in the data mart, and stores the data mining results as enriched data in the data warehouse.

The data analysis process 400 may be performed by a processor on a computing system, such as data warehouse computer system 110 of FIG. 1. The data analysis processor is directed by a method, script, or other type of computer program that includes executable instructions for performing the data analysis process 400. An example of such a collection of executable instructions is the data analysis process 168 of FIG. 1.

The data analysis process 400 includes an extract, transform and load (ETL) sub-process 410, a data mining sub-process 420 that uses a data mart, and a data enrichment sub-process 450 for storing the data mining results. The automated mining process 400 begins at a predetermined time and date, typically a recurring predetermined time and date. The ETL process 410 extracts data from a transactional processing or other type of source system and loads the data to a data warehouse, as described previously with respect to ETL sub-process 340 of FIG. 3.

After completing the ETL sub-process 410, the data warehouse processor copies data from the data warehouse to the data mining mart for use in a data mining run (step 430). For example, when the data warehouse and the data mining mart are located on the same computer system, the data warehouse processor may insert into database tables of a data mining mart a copy of some of the data rows stored in the data warehouse. Alternatively, when the data warehouse is located on a different computer system than the computer system on which the data mart is located, the data warehouse processor may extract data from the data warehouse on a computer system and transmit the data to the data mart located on a different computer system. The data warehouse processor then may execute a remote procedure call or other collection of executable instructions to load data into the data mart. In some implementations, the data warehouse processor may replicate data from the data warehouse to the data mining mart—that is, the data warehouse processor copies the data to the data mining mart and synchronizes the data mining mart with the data warehouse such that changes made to one of the data warehouse or the data mining mart are reflected in all other of the data warehouse or the data mining mart. In some implementations, the data warehouse processor may transform the data from the data warehouse before storing the data in the data mining mart.

The data warehouse processor then performs a data mining run, as described in step 350 in FIG. 3, using data in the data mining mart (step 440). The steps 430 and 440 may be referred to as a data mining sub-process 420. When the data mining sub-process 420 is completed, the data warehouse processor stores the data mining results in the data warehouse or a transaction computer system (step 450), as described in step 360 in FIG. 3. Alternatively or additionally, in some implementations, the data warehouse processor may store the data mining results in a transaction computer system, such as a customer relationship management system.

Figure 5:
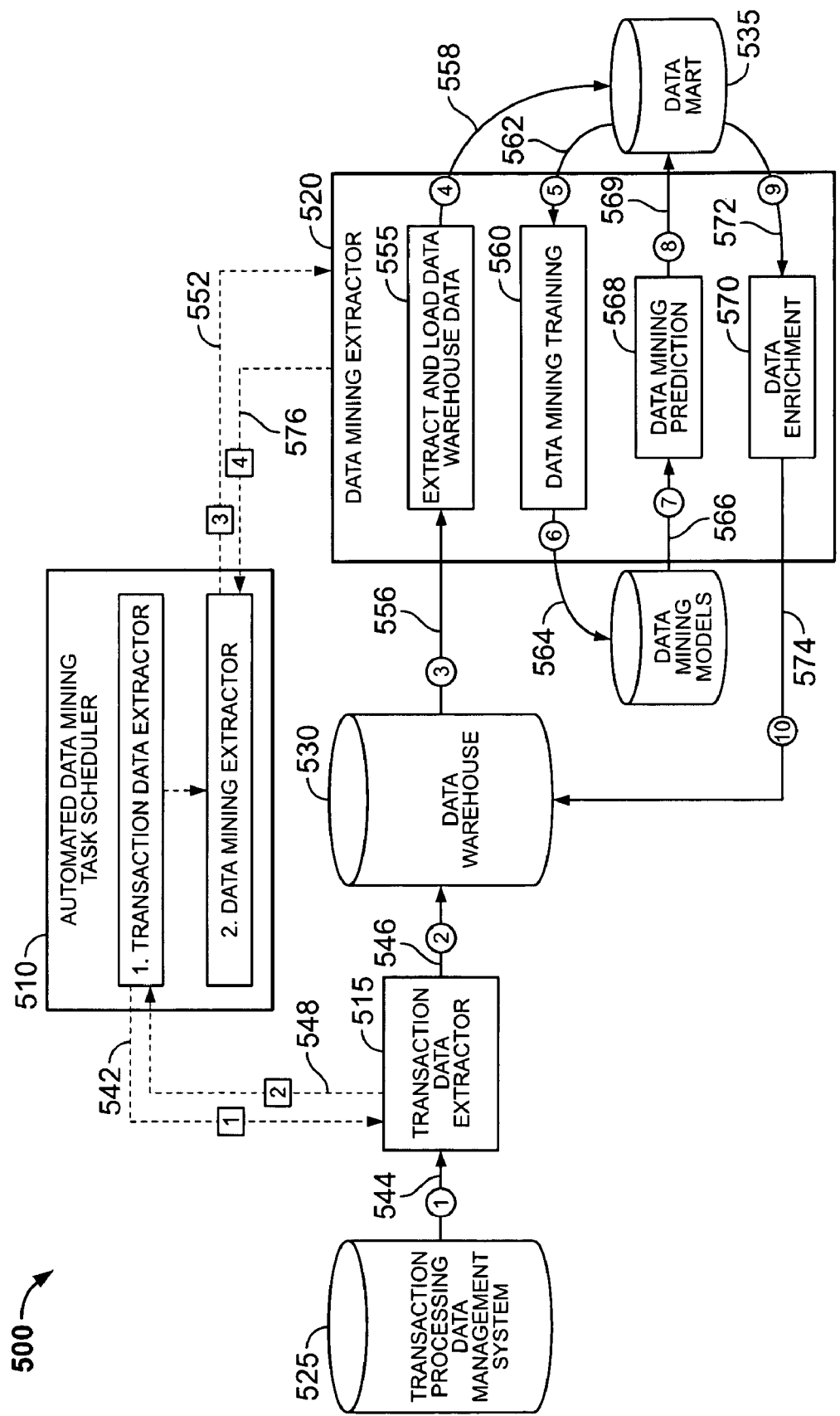
FIG. 5 is a block diagram of the components of a software architecture for a data analysis process developed with a data analysis workbench.

FIG. 5 depicts the components of a software architecture 500 for a data analysis process developed using a data analysis workbench. The software architecture 500 may be used to implement the data analysis process 300 described in FIG. 3 or the data analysis process 400 described in FIG. 4. The software architecture 500 may be implemented, for example, on computer system 110 of FIG. 1. FIG. 5 also illustrates a data flow and a process flow using the components of the software architecture to implement the data analysis process 400 in FIG. 4.

The software architecture 500 includes an automated data mining task scheduler 510, a transaction data extractor 515, and a data mining extractor 520. The software architecture also includes a transaction processing data management system 525 for a transaction processing system, such as transaction computer system 120 or transaction computer system 130 in FIG. 1. The software architecture also includes a data warehouse 530, such as the data warehouse 165 in FIG. 1, and a data mart 535, such as the optional data mart 174 in FIG. 1.

One example of the automated data mining task scheduler 510 is a process chain for triggering the transaction data extractor 515 and the data mining extractor 520 at a predetermined date and time. In general, a process chain is a computer program that defines particular tasks that are to occur in a particular order at a predetermined date and time. For example, a system administrator or another type of user may schedule the process chain to occur at regular intervals, such as at one o-clock a.m. the first Saturday of a month, every Sunday at eight o'clock a.m., or at two o'clock a.m. on the first day and the fifteenth day of each month. A process chain may include dependencies between the defined tasks in the process chain such that a subsequent task is not triggered until a previous task has been successfully completed. In this example, the automated data mining task scheduler 510 is a process chain that calls two extractor processes: the transaction data extractor 515 and the data mining extractor 520. The data mining extractor 520 is only initiated after the successful completion of the transaction data extractor 515.

The automated data mining task scheduler 510 starts the transaction data extractor 515 at a predetermined date and time, as illustrated by process flow 542. In general, an extractor is a computer program that performs the extraction of data from a data source using a set of predefined settings. Typical settings for an extractor include data selection settings that identify the particular data attributes and data filter settings that identify the criteria that identifies the particular records to be extracted. For example, an extractor may identify three attributes—customer number, last purchase date, and amount of last purchase—that are to be extracted for all customers that are located in a particular geographic region. The extractor then reads the attribute values for the records that meet the filter condition from the data source, maps the data to the attributes included in the data warehouse, and loads the data to the data warehouse. An extractor also may be referred to as an upload process.

The transaction data extractor 515 extracts, using predefined settings, data from the transaction processing data management system, as indicated by data flow line 544, and transforms the data as necessary to prepare the data to be loaded to the data warehouse 530. The transaction data extractor 515 then loads the extracted data to the data warehouse 530, as indicated by data flow 546. After the extracted data has been loaded, the transaction data extractor 515 returns processing control to the automated data mining task scheduler 510, as indicated by process flow 548. When returning processing control, the transaction data extractor 515 also reports the successful completion of the extraction.

Based on the successful completion of the transaction data extractor 515, the automated data mining task scheduler 510 starts the data mining extractor 520, as illustrated by process flow 552. In general, the data mining extractor initiates a data mining process using the newly loaded transaction data in the data warehouse 530. The data mining process analyzes the data and writes the results back to the data warehouse.

First, the data mining extractor 520 extracts data from the data warehouse 530 (function 555), as illustrated by data flow 556, and loads the extracted data to the data mart 535, as illustrated by data flow 558, for use by the data mining analysis. The data mining extractor 520 then performs a data mining training analysis (function 560) using the data from the data mart 535, as illustrated by data flow 562. The data mining extractor 520 updates the appropriate data mining model in data mining model 565 with the results of the data mining training analysis, as illustrated by data flow 564.

The data mining extractor 520 uses the results of the data mining training analysis from a data mining model 564, as illustrated by data flow 566, to perform a data mining prediction analysis (function 568). The data mining extractor 520 stores the results of the data mining prediction analysis in the data mart 535, as illustrated by data flow 569.

The data mining extractor 520 then performs a data enrichment function (function 570) using the results from the data mart 535, as illustrated by data flow 572, to load the data mining results into the data warehouse 530, as illustrated by data flow 574. After enriching the data warehouse 530 with the data mining analysis results, the data mining extractor 520 returns processing control to the automated data mining task scheduler 510, as depicted by process flow 576. When returning processing control, the data mining extractor 520 also reports to the automated data mining task scheduler 510 the successful completion of the data mining analyses and enrichment of the data warehouse. To do so, the data mining extractor 520 may report a return code that is consistent with a successful process.

The use of a task scheduler, here in the form of a process chain, to link the task of extracting the transaction data from a source system with the task of performing the data mining process may be useful. For example, the process for loading transaction data to the data warehouse is combined with an immediate data mining analysis and enrichment of the data warehouse data with the results of the analysis. The linkage of the transactional data availability with the automatic performance of the data mining analysis may reduce, perhaps even substantially reduce, the lag between the time at which the transaction data first becomes available in the data warehouse and the time at which the data enriched with data mining analysis results becomes available in the data warehouse.

There also may be advantages in a type of data loading computer program (here, an extractor) for both (1) the load of the transaction data to the data warehouse and (2) the performance of the data mining analysis and the enrichment of the data warehouse data with the data mining analysis results. This may be particularly true when a data mart is used for temporary storage of data from the data warehouse in which an extraction is to be performed. For example, in some data warehousing systems, a task scheduler may be available only for use with a data loading process and may not be available for general use with a data mining process. In such a case, wrapping the data mining process within a data loading process allows a data mining process to be automatically triggered at a predetermined time on a scheduled basis (such as daily, weekly or monthly at a particular time).

More generally, the use of the same types of techniques, procedures and processes for both a data extraction process and an analytical process of data mining run may be useful. For example, it may enable the use of a common software tool for administering a data warehouse and a data mining run, particularly when data is extracted from a data warehouse for use by a data mining run. The use of the same techniques, procedures and processes for both a data extraction process and an analytical process also may make a function available to both processes when the function was previously available only to one of the analytical process or the data extraction process. It also may encourage consistent behavior from a data warehouse process and a data mining analysis, which may, in turn, reduce the amount of training required by a system administrator.

Figure 6:
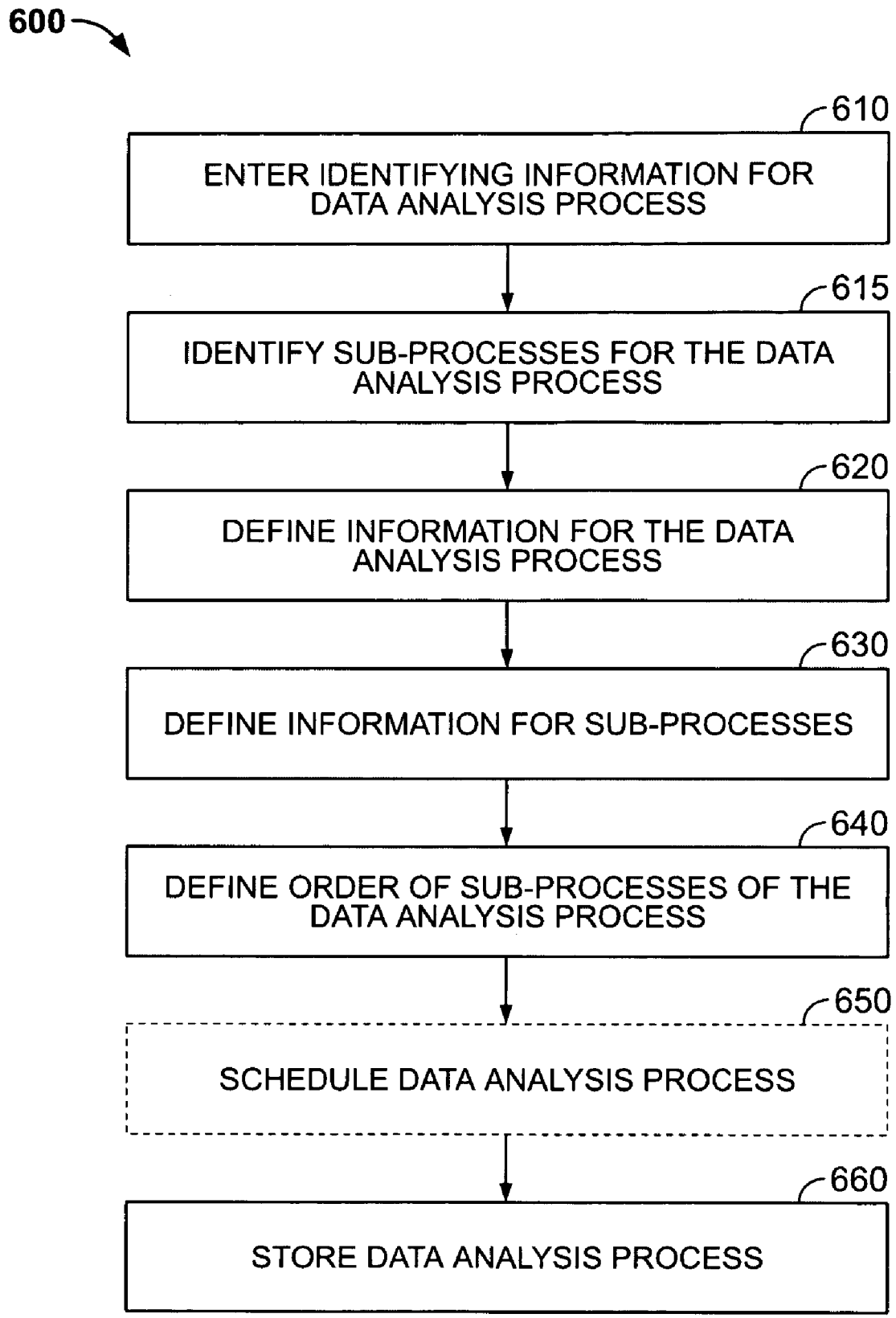
FIG. 6 is a block diagram of a process to use a data analysis workbench to design a data analysis process.

FIG. 6 depicts a process 600 supported by a data analysis workbench for defining a data analysis process, such as data analysis process 300 in FIG. 3 or process 400 in FIG. 4. The data analysis workbench presents a user interface to guide a user in defining a data analysis process. In general, the data analysis workbench receives from a user an indication of the sub-processes to be performed in the data analysis process, receives user-entered information applicable to the data analysis process and settings relevant to the sub-processes, receives scheduling information from the user, and generates a data analysis process based on the received from the user.

The process 600 to define a data analysis process begins when the data analysis workbench presents a user interface for the user to enter identifying information for the data analysis process being defined (step 610). For example, the user may enter a name or another type of identifier and a description of the data analysis.

The data analysis workbench then presents an interface that allows a user to identify sub-processes for the data analysis process (step 615). Examples of sub-processes include (1) an extraction sub-process that extracts from a source system appropriate data and transmits the extracted data to a data source to be used for the data analysis process, (2) a transformation sub-process for changing the data format from a format used by the source system to a different format used for the data analysis, (3) a loading sub-process for storing the data in the data storage accessible to the data analysis, (4) a data mining sub-process for performing data analysis, and (5) an deployment sub-process for making the data mining results available in a data warehouse, a data mart, or through a transaction computer system, such as a customer relationship management system. A user may identify the steps for the data analysis process by selecting sub-processes from a list of predetermined sub-processes presented in the user interface.

In some implementations, multiple sub-processes of the same type may be identified. For example, a user may identify a deployment sub-process to provide data mining results to a transactional application on a computer system. The user also may identify another deployment sub-process to provide the data mining results to a data warehouse or other type of data store used by an analytical application. In some implementations, the deployment sub-processes may be performed concurrently or substantially concurrently.

The data analysis workbench then presents an interface that allows a user to define information for the data analysis process (step 620). Such process information may include common settings that are to be used across the sub-processes in the data analysis process. Typically, the common settings identify the data to be used in the data analysis process. For example, the user may select from a list of meta-data elements that describes data available in multiple computer systems for storing data used in the data analysis process. In general, each meta-data element is associated with corresponding data elements in each computer system that stores a corresponding data element. For example, a data dictionary or other type of data mapping information may be used that identifies a meta-data element and corresponding data elements in computer systems, as illustrated in the table below. The correspondence between a meta-data element with a transaction data element in a transaction computer system (such as a customer relationship management system) and a data warehouse data element is shown below in Table 1. In some cases, a corresponding data element to a particular meta-data element may exist only in one computer system. In other cases, a corresponding data element is not stored in a computer system but is derived (that is, calculated) by the computer system based on data stored in one of the computer systems. In such a case, an indication of the computer program, function or method available in the computer system to derive the data element may be stored in association with the corresponding meta-data element.

TABLE 1

| Meta-data Element | Transaction Data Element | Data Warehouse Data Element |
|---|---|---|
| Customer Number | Bus_PartnerID in Business Partner Object | CustomerID in Customer Table |
| Customer Region | Derived from Business Partner Address sub-object of BusinessPartner Object | CustomerRegion in Customer Table |
| Likelihood of Churn | | LikelihoodOfChurn in Customer Table |

In another example, the user may select data to be used in the data analysis process from a list of data elements for a particular computer system or computer systems. In some cases, the user also may have to select the data type to be used for the selected data element. This may be particularly true when the data element is stored by more than one computer system and the computer systems use different data types to represent the same data element. For example, as described previously in FIG. 2, one computer system may store an attribute value using a numeric code in a data element with a numeric data type, whereas another computer system may store the attribute value as a character code in a data element with a character data type. In such a case, the user identifies whether the numeric data type or character data type is to be used for the data element in the data analysis process.

The data analysis workbench presents an interface that allows a user to define information relevant to particular sub-processes (step 630). This may be accomplished, for example, by when the data analysis workbench branches to another computer program that presents a user interface for entering information, such as parameters, relevant to a particular sub-process. For example, the data analysis workbench may initiate an executable computer program on another computer system to display a user interface that is associated with another application program and used for configuring or otherwise defining a computer program for performing a sub-process. The data analysis workbench also may present a user interface that for defining a particular sub-process (such as a user interface for defining an extraction, loading, data mining or enrichment sub-process).

In one example, the data analysis workbench presents an interface that allows a user to identify settings for a particular data mining analysis sub-process. For example, the data analysis workbench may present a list of data mining analysis templates, such as a template for a particular type of a customer loyalty analysis or a template for a particular type of cross-selling analysis, from which the user selects.

Based on the data mining analysis template selected, the data analysis workbench presents an appropriate interface to guide the user through the process of entering the user-configuration data mining information to configure the template for the particular data mining analysis being defined. In one example of defining a data mining analysis for determining the effect of a particular marketing campaign, the user enters an identifier for the particular marketing campaign to be analyzed, the particular customer attributes to be analyzed, the attributes to be measured to determine the effect of the marketing campaign (such as sales attribute), and the filter criteria for selecting the records to be analyzed. The data mining analysis template includes a portion for the transaction data extraction, such as transaction data extractor 515 in FIG. 5, and a portion for data mining extraction, such as data mining extractor 520 in FIG. 5.

The user continues defining sub-process information that is relevant for particular sub-processes until the user is finished. In some cases, a particular sub-process may not require any information to be defined. In other cases, some sub-process information may be relevant for more than one sub-process (but not relevant for all sub-processes). For example, in defining a data mining template for use in a data mining sub-process, information relevant to a deployment sub-process also may be defined.

The user then defines the order in which the sub-processes are to be executed (step 640). In general, a sub-process is only executed after the successful completion of all of its predecessor sub-processes. A sub-process is generally executed soon after the completion of the immediately preceding sub-process. Some implementations may allow a user to specify conditions that must be fulfilled before a particular sub-process is initiated. In some cases, a user may be permitted to indicate that a particular sub-process is to be executed even if a previous sub-process did not successfully execute.

The user optionally schedules when the data analysis process should be automatically initiated (step 650). For example, the user may identify a recurring pattern of dates and times for triggering the data analysis process. This may be accomplished through the presentation of a calendar or the presentation of a set of schedule options from which the user selects. The first sub-process in the data analysis process is initiated based on the scheduled date and time of the data analysis process. Subsequent sub-process are generally implicitly scheduled based on the scheduling of the data analysis process. Some implementations, however, may permit a user to schedule separately each sub-process in the data analysis process.

The data mining workbench then stores the data analysis process (step 660). To do so, for example, the data mining workbench may use the name or identifier entered by the user as the name of the stored data analysis process. For example, the entered process information and the entered sub-process information may be stored in association with a computer program configured to perform a data analysis process having the sub-processes identified by the user. This may be accomplished, for example, by using a process chain to control the execution of executable computer programs for each sub-process of the data analysis process. The data analysis process also may be added to a task scheduler and scheduled based on the information the user entered.

Figure 7:
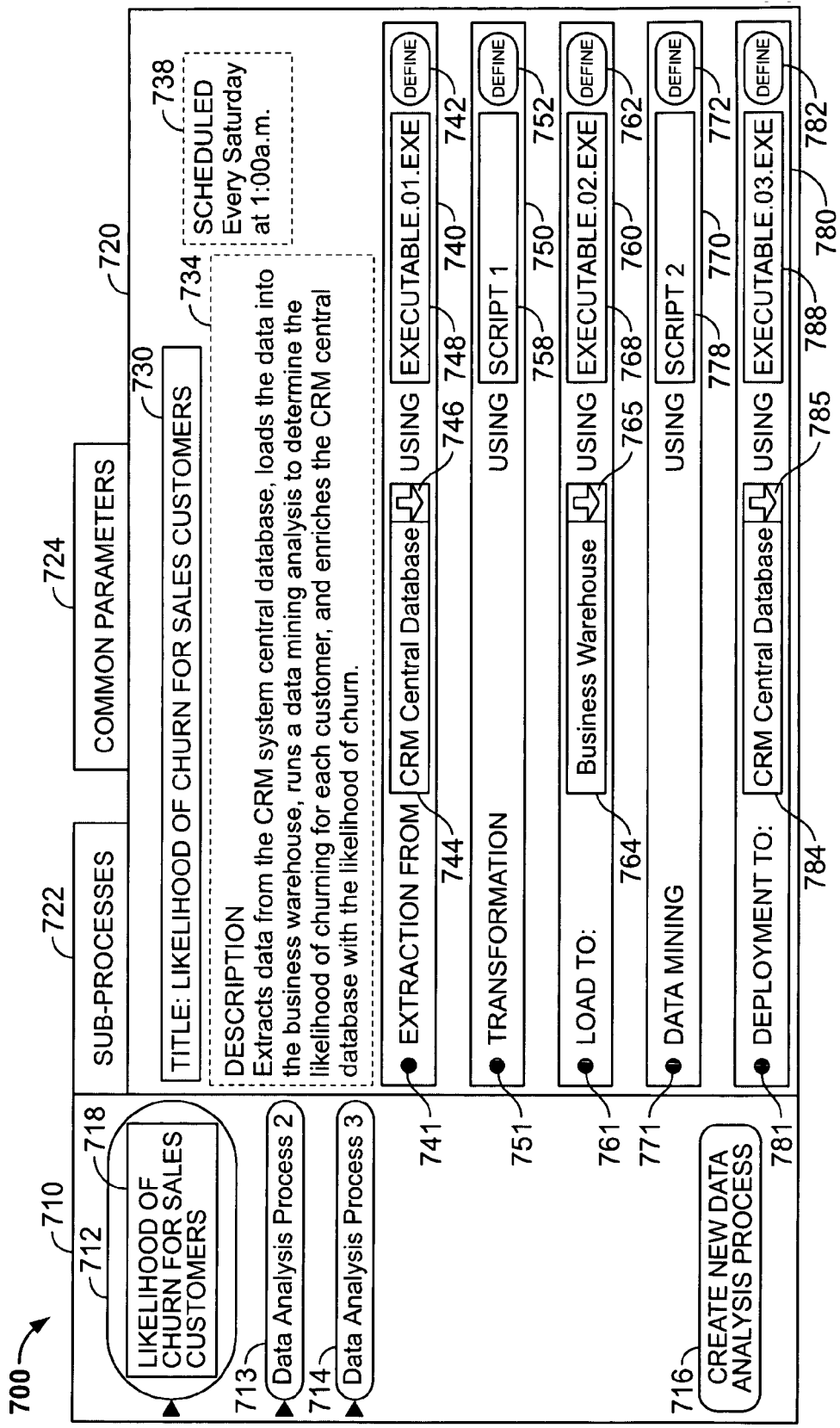
FIGS. 7, 8 and 9 are block diagrams of example user interfaces for a data analysis workbench.
Figure 8:
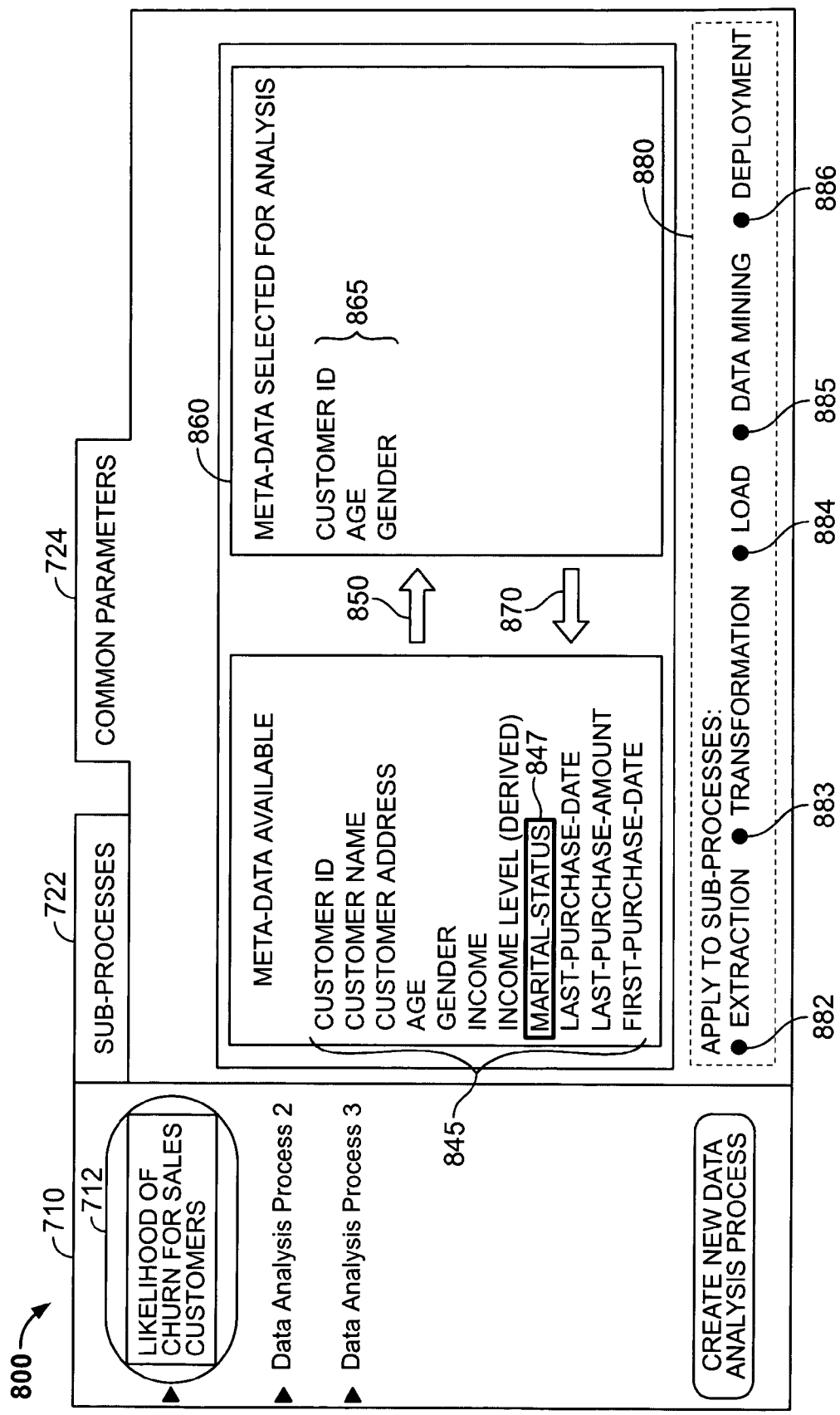

FIGS. 7 and 8 illustrate an example of a user interface 700 that is displayed to a user who is defining a data analysis process using a data analysis workbench. The user interface 700 includes a data analysis window 710 that displays data analysis processes 712-714 that have been defined using the data analysis workbench. The data analysis window 710 also includes a control 716 for initiating a process to create a new data analysis process, as described more fully below. In the illustration of the user interface 700, data analysis process 712 is selected, as illustrated by the box 718 used to highlight the selected data analysis process 712.

The user interface 700 also includes a sub-processes window 720 that displays information related to the particular data analysis highlighted in the data analysis window 710. The user indicates that the sub-processes window 720 is to be displayed by activating the sub-processes tab control 722, which may be accomplished by clicking on the sub-processes tab control 722 with a pointing device. In contrast, when a user selects the common parameters tab control 724, a common parameters window 820 is displayed, as illustrated in FIG. 8 and described more fully below.

The sub-processes window 720 includes a title 730 for the selected data analysis process 718. The sub-processes window 720 also optionally displays a description 734 and scheduling information 738 for the selected data analysis process 712. The optional description 734 may help a user to identify a particular data analysis process from the displayed data analysis processes in the data analysis process window 710. The optional scheduling information 720 indicates when the selected data analysis process 712 is to be initiated, such as described previously in step 650 in FIG. 6. As illustrated, the data analysis process 712 is scheduled to be automatically-initiated at a predetermined weekly date and time, specifically each Saturday at 1 o'clock a.m.

The sub-processes window 720 also includes sub-process information 740, 750, 760, 770 and 780 for each of the identified sub-processes in the selected data analysis process 718. In particular, sub-process information 740 relates to a extraction sub-process; sub-process information 750 relates to a transformation sub-process; sub-process information 760 relates to a loading sub-process; sub-process information 770 relates to a data mining sub-process; and sub-process information 780 relates to a deployment sub-process 740. Each of the sub-process information 740, 750, 760, 770 and 780 includes a control 741, 751, 761, 771 and 781 that is used to indicate whether a particular type of sub-process—that is, an extraction, a transformation, a loading, a data mining or a deployment sub-process—is to be included in the data analysis process and another control 742, 752, 762, 772 and 782 that is used to define the particular type of sub-process, as described more fully below.

Each of extraction sub-process information 740, loading sub-process information 760, and enrichment sub-process information 780 also identifies a system 744, 764 or 784, respectively, that is accessed during the execution of the sub-process. A particular system may be selected by a user from a list of possible systems that are displayed when the arrow control 745, 765 or 785, respectively, is executed.

Each of the sub-process information 740, 750, 760, 770 and 780 also includes a computer program indicator 748, 758, 768, 778 and 788, respectively, that indicates an computer program that is initiated to perform the sub-process. The indicated computer program, for example, may be an executable computer program that is compiled and ready to run, an interpreted computer program that requires additional translation of the instructions of the program to be executed, or a script that can be directly executed by a computer program that understands the scripting language in which the script is written.

A user may use the user interface 700 to define a data analysis process. For example, in response to a user activating the create control 716, a sub-process window 722 is displayed for which no data associated with a particular data analysis process is yet associated. The user enters a title 730 and an optional description 734 for the data analysis process. The title 730 is used to identify the particular data analysis process in the list of data analysis processes shown in the data analysis window 710.

The user identifies sub-processes for the data analysis process by activating one or more of the controls 741, 751, 761, 771 and 781 that is used to indicate whether the sub-process extraction 740, transformation 750, loading 760, data mining 770 or deployment 780 associated with the controls 741, 751, 761, 771 or 781 is included in the data analysis process.

When an extraction sub-process, a loading sub-process, or a deployment sub-process is selected, the user also must identify a source system 744, 764 or 784 that is accessed during the execution of one of the sub-processes. The source system, for example, may be an application or a database (or another type of data source) associated with an application or a suite of applications. To identify a source system, a user selects a particular system from a list of possible systems that are displayed when the arrow control 745, 765 or 785 is activated.

The user defines each identified sub-process by activating the define sub-process control 742, 752, 762, 772 or 782 associated with a particular sub-process to be defined. When user defines an extraction sub-process, a loading sub-process, or a deployment sub-process 780, the processor controlling the user interface branches, based on the identified source system, to another computer program that presents a user interface for entering information relevant to a particular sub-process and selecting a computer program for the sub-process. In some implementations, the user interface for entering the sub-process information may allow the user to create a sub-process, as described previously in step 630 in FIG. 6. By way of example, when the CRM central database is identified as the source system for the extraction sub-process, a user interface to identify or define a computer program for extracting data from the CRM central database is presented. This may include defining a new computer program to be used for the sub-process or defining new parameters for use with a pre-existing computer program that is selected using the interface, which may be accomplished as previously described in step 630 in FIG. 6. After the computer program to be used to perform the sub-process is identified or defined, the name of the program for the sub-process is displayed as a computer program indicator 748, 768 or 788 in the sub-process window 722.

When a sub-process being defined does not include a source system, information associated with other sub-processes be used to help the user define the sub-process. For example, when a user indicates that an extraction sub-process is to extract data from a particular system, the options of the types of data transformations presented to the user may be limited to the data transformations that are associated with transforming data from the particular system. In such a case, the user may be presented with a list of predetermined data transformation sub-processes from which to select. In another example, a user interface for defining a data transformation process for the data included in the source system 744 identified for the extraction sub-process may be initiated. In any case, a computer program indicator of a computer program to use for the sub-process is identified and displayed in the sub-process window 722.

More particularly, to define an extraction sub-process, a transformation sub-process, a loading sub-process, a data mining sub-process and a deployment sub-process for a data analysis process, a user first identifies that each of the extraction, transformation, loading, data mining and enrichment sub-processes is to be included in the data analysis process by activating each of the controls 741, 751, 761, 771 and 781. In some implementations, on additional or alternative element may be included in the sub-processes window 722 to allow a user to enter an integer that identifies the order in which each of the identified sub-processes is to be performed.

To define information related to the extraction sub-process, the user selects a source system 744 from a list of possible source systems presented when the user activates the arrow control 745. As illustrated, the CRM central database has been selected as the source system 744. Then the user activates the define control 742 for the extraction sub-process, and, in response, the processor controlling the user interface branches to a CRM user interface for defining a data extraction sub-process for the CRM central database. Once the user has completed defining a data extraction sub-process using the CRM user interface, control is returned to the data analysis workbench along with a computer program indicator 748 for the extraction sub-process. The computer program indicator 748 is displayed in the sub-processes window 722.

The user then activates the define control 752 for the transformation sub-process. In response, a list of predetermined computer programs for transforming CRM data is presented and the user selects one of the computer programs. An indicator 758 for the computer program is displayed.

The user selects a particular system 764 to which the CRM data is to be loaded. More particularly, the user selects the Business Warehouse as the source system 764 from a list of possible source systems presented when the user activates the arrow control 765. The user then activates the define control 762 to branch to a user interface for defining information for a sub-process to load data to the Business Warehouse. Once completed, the control is returned to the data analysis workbench along with a computer program indicator 768 for the loading sub-process. The computer program indicator 768 is displayed in the sub-processes window 722.

Next, the user defines a data mining process by first activating the define control 772. In one example, a list of predetermined data mining routines is presented from which the user selects. An indication of the user's selection is displayed as computer program indicator 778. In another example, the user may branch to a user interface for defining a data mining process.

Similarly, to define the deployment sub-process, the user identifies the source system 785 in which the data mining results are to be stored and defines the deployment sub-process using an appropriate user interface to which control is branched based on the selection of the source system 785. As illustrated, the data mining results are to be stored in the CRM central database. In other examples, the data mining results may be stored in the analytical processing source for the data mining sub-process (here, the business warehouse) or may be stored in another system that is not involved in the extraction sub-process or the loading sub-process.

Referring now to FIG. 8, the display of the common parameters window 820 is controlled through the selection by a user of the common parameters tab control 724. The common parameters window 820 includes a meta-data definition window 830 that is used to select the meta-data to be used in one or more of the sub-processes of the selected data analysis process 712. The meta-data definition window 830 includes a meta-data available window 840 that shows the meta-data attributes 845 that are available for use in the data analysis process. To select a particular meta-data attribute, the user selects a particular meta-data attribute, such as by scrolling a cursor over the list of meta-data attributes 845 and highlighting a particular meta-data attribute 847. With the particular meta-data attribute 847 selected, the user presses the add control 850 that adds the selected meta-data attribute 847 to the meta-data selected window 860 in the list of selected meta-data attributes 865. To reverse a previous selection of a meta-data attribute, a user presses the remove control 870 to remove a highlighted meta-data attribute from the list of selected meta-data attributes 865 in the meta-data selected window 860.

The common parameters window 820 also may include a sub-process window 880 that indicates which of the sub-processes included in the selected data analysis process 712 use the selected meta-data—that is, the meta-data 865 in the meta-data selected window 860. The user may modify the selection of the sub-processes by activating one or more of the controls 882-886, which by way of example may be a push-button control, to identify a particular sub-process associated with the control. Once a particular sub-process has been identified, a user may de-select the particular sub-process by de-activating an activated control.

Figure 9:
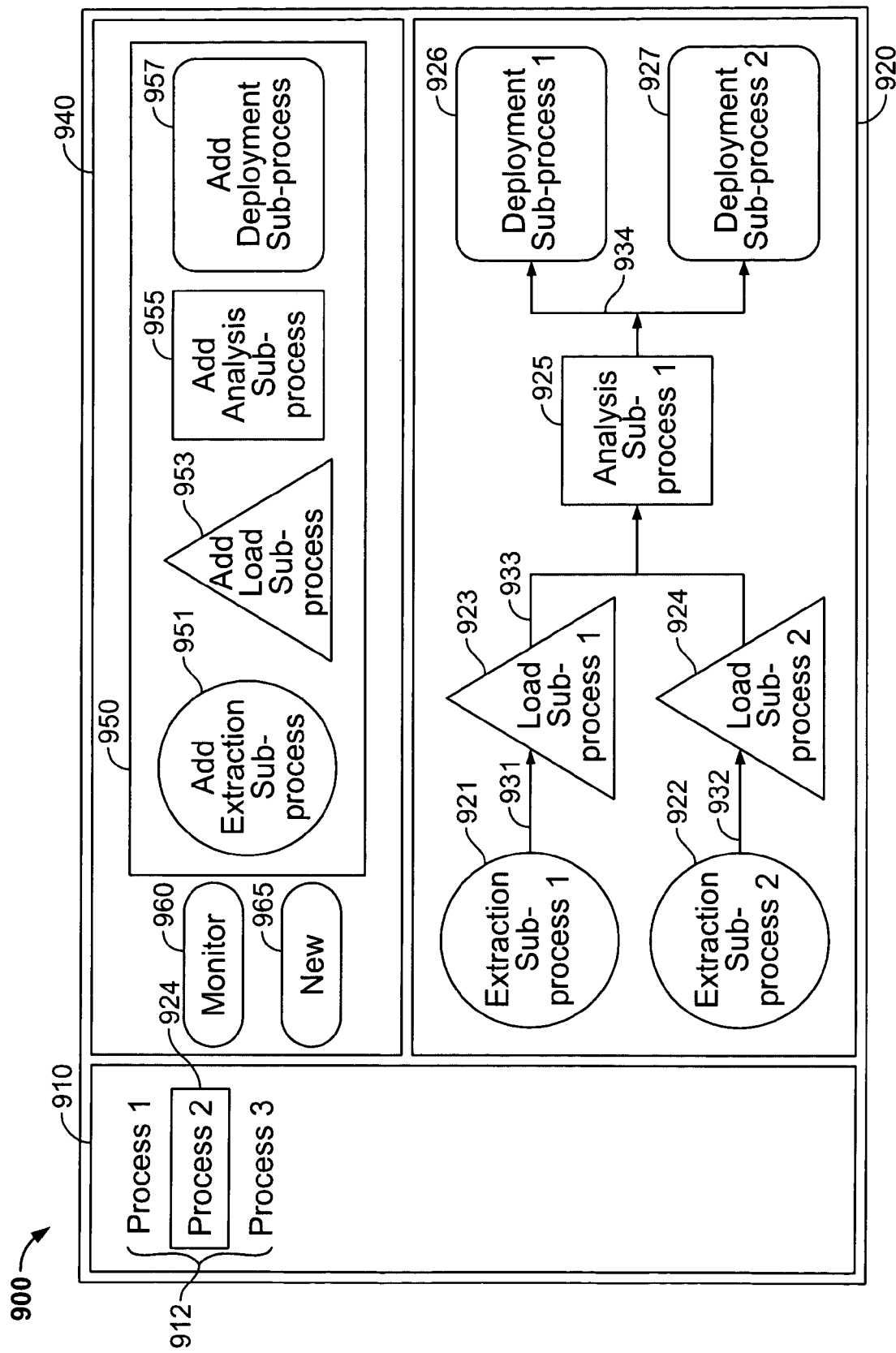

FIG. 9 depicts another example of a user interface 900 that is displayed to a user who is defining a data analysis process using a data analysis workbench. The user interface 900 includes a process list window 910 that displays a list 912 of data analysis processes that a user may revise, monitor or control using the user interface 900. In some implementations, the list 912 of data analysis processes may be grouped according to business purposes, technical properties, or other characteristics. By way of example, multiple data analysis processes that are related to customer satisfaction scoring may be grouped into a customer satisfaction data analysis group. The list 912 also may include information about a data analysis process, such as whether a process is currently running, scheduled to be run, or has generated or encountered an error. The information may be displayed in the process list window 910, for example, when a symbol is displayed adjacent to a particular data analysis process in the list 912 or text is displayed when a pointing device hovers over a particular data analysis process in the list 912. One of the data analysis processes in the list 912 may be highlighted or otherwise selected. Here, the process 914 is selected as indicated by the rectangle surrounding the process 914 in the list 912.

The user interface 900 also includes a data analysis window 920 that displays sub-processes of a data analysis process highlighted in the process list window 912. The data analysis window 920 also displays the flow between the sub-processes of the highlighted data analysis process. The data analysis window 920 includes symbols 921-927 for each sub-process included in the data analysis process 914 highlighted in the process list window 910. In this example, each different type of sub-process is represented by a different shape. More particularly, extraction sub-processes 921 and 922 are represented by a circle, load sub-processes 923 and 924 are represented by a triangle, an analysis sub-process 925 is represented by a square, and deployment sub-processes 926 and 927 are represented by a rectangle with rounded corners. The flow from one sub-process to another is depicted by links 931-934. In some cases, a flow from one sub-process may lead to another sub-process, as illustrated by links 931 and 932. In other cases, a flow from two sub-processes may lead to the same sub-process, as illustrated by link 933. In yet another case, a flow from one sub-process may lead to two other sub-processes, as illustrated by flow 934. The data analysis process shown in the data analysis window 920 extracts data using two extraction sub-processes 921 and 922 and loads, using two extraction sub-processes 923 and 924, the extracted data to an analytical data source. The data may be extracted from the same or different data sources. The data analysis process then performs an analytical sub-process 925 on the data extracted using both extraction sub-processes 921 and 922 and loaded using both loading sub-processes 923 and 924. Afterwards, the data analysis process stores, using the deployment sub-processes 926 and 927, the data resulting from the data analysis sub-process 925. The data stores to which the resulting data are stored may be the same or different. In one example, the data analysis process may store some or all of the resulting data in an analytical data store in one deployment sub-process and may store some or all of the resulting data in a transactional data store. The ability of one sub-process to branch to multiple other sub-processes that are substantially or partially concurrently executed may help to improve the efficiency of the data analysis process.

The user interface 900 also includes a control window 940 having controls 950 for adding sub-processes to the data analysis highlighted in the list 912 and depicted in the data analysis window 920. The controls 950 include a control for a particular type of of sub-process. Here, the controls 950 include a control 951 for adding an extraction sub-process, a control 953 for adding a load sub-process, a control 955 for adding an analysis sub-process, and a control 957 for adding a deployment sub-process. Each of the controls 950 enables a new sub-process of a particular sub-process type to be added. For example, in response to the activation of a control, a symbol corresponding to the selected sub-process type may be displayed in the data analysis window 920. The user then may drag the symbol to a desired location in the data analysis window 920 and define settings for the new sub-process, such as by completing a pop-up window with appropriate setting information. By way of example only, a user may use a pointing device to activate a new sub-process detail screen that displays entry fields for information appropriate for the type of sub-process being added. Additionally, a user may be queried as to whether the user wants to include, in the new sub-process, meta-data from one or more of the previously-defined sub-processes.

The control window 940 also includes a monitor control 960 that is operable to display status information for a sub-process. Typically, the status information displayed is applicable to the sub-process being run. When no sub-process is being run, status information may be displayed that is applicable to the last completed sub-process.

Controls for other types of functions also may be included in the user interface 900. One example is the new control 965 that is operable to initiating a process to create a new data analysis process. In another example, a control for a consistency check function may be included that determines whether inconsistencies exist in the sub-processes defined for a data analysis process. In yet another example, a control may be operable to lock the data analysis process such that changes not permitted to be made to the data analysis definition. In some cases, a data analysis process may be locked except to a user that has a special privilege to unlock a locked data analysis process.

The user interface 900 visually shows the sub-processes included in a data analysis process and how the sub-processes are connected. This may enable a user to more easily design and/or comprehend aspects of a data analysis process. The user interfaces 700 and 900 are described as having windows for which a user may control the display position of each window on a display device. A user's control over the display position of a window may include, for example, indirect or direct control of the coordinates of the display device at which the window is positioned, the size of the window, and the shape of the window. Alternatively, any of the windows described herein, including but not limited to the data analysis window 710, the sub-processes window 720, the common parameters window 820, the common parameters window 820, the meta-data available window 840, the meta-data selected window 860, the sub-process list window 880, the process list window 910, the data analysis window 920, or the control window 940, may be implemented as a pane of a graphical user interface in which the pane is displayed in a fixed position on a display device.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. Information carriers suitable for embodying computer program instructions and data include all forms of non-volatile memory, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in special purpose logic circuitry.

Although the techniques and concepts are described using extraction, load, analysis, and deployment sub-processes, the techniques and concepts may be applicable to other types of sub-processes. A number of implementations of the invention have been described. Nevertheless, it will be understood that various modifications may be made without departing from the spirit and scope of the invention. Accordingly, other implementations are within the scope of the following claims.

What is claimed is:

1. A computer program product tangibly embodied in a storage medium, the computer program product including instructions that when executed generate a graphical user interface on a display device for using a computer to display and modify a data analysis process, the graphical user interface comprising:
    a process list display configured to:
        display identifications of data analysis processes, and
        receive user input selecting an entry of an identification of a data analysis process; and
    a data analysis display configured to:
        display representations of sub-processes included in the data analysis process identified by the selected entry, the displayed representations of sub-processes including:
            a representation of a data mining sub-process for creating a data attribute by performing an analytical process on data from an analytical processing data source,
            a representation of at least one of (1) an extraction sub-process for extracting data from a first transactional data source, (2) a transformation sub-process for transforming the extracted data from a data format used by the first transactional data source to a data format used for analytical processing, and (3) a loading sub-process for loading data into the analytical processing data source, and
            a representation of a deployment sub-process for storing the created data attribute in one of the first transactional data source, a second transactional data source other than the first transactional data source, or a second analytical data source used for analytical processing, and
        display connections between the displayed sub-processes, the connections indicating a sequence with which the displayed sub-processes are performed when performing the data analysis process.

2. The computer program product of claim 1 wherein each type of the sub-processes displayed in the data analysis process display is represented by a different shape than shapes representing other types of sub-processes displayed in the analysis sub-process display.

3. The computer program product of claim 1 wherein the graphical user interface further comprises controls configured to add types of sub-processes to the data analysis process displayed in the data analysis display.

4. The computer program product of claim 3 wherein the controls comprise one or more of a control configured to add an extraction sub-process, a control configured to add a load sub-process, a control configured to add an analysis sub-process, and a control configured to add a deployment sub-process.

5. The computer program product of claim 1 wherein the graphical user interface further comprises a control configured to display information about status of the data analysis process.

6. A computer program product tangibly embodied in a storage medium, the computer program product including instructions that when executed generate a graphical user interface on a display device for using a computer to define a data analysis process, the graphical user interface comprising:

a sub-processes display configured to:
    receive user input indicating an entry of an identification at least one of (1) an extraction sub-process for extracting data from a data source, (2) a transformation sub-process for transforming the extracted data from a data format used by the data source to a data format used for analytical processing, (3) a loading sub-process for loading data into a data source that is used for analytical processing, (4) a data mining sub-process for creating a data attribute by performing an analytical process on data from the analytical processing data source, and (5) a deployment sub-process for storing a data attribute created in another sub-process, and
    receive user input indicating an entry identifying a computer program to be associated with each of the identified sub-processes such that execution of the computer program causes the identified sub-process to be performed; and
a common data display configured to receive user input indicating an entry of selected meta-data elements to be used in the data analysis process wherein each meta-data element is associated with a corresponding data element in the data source and with a corresponding data element in the analytical processing data source.

7. The computer program product of claim 6 wherein:
the data source is a transactional data source, and
the deployment sub-process stores the created data attribute in the transactional data source.

8. The computer program product of claim 7 wherein the deployment sub-process stores the created data attribute in one of the data source, a second transactional data store other than the transactional data source, or a second analytical data store other than the analytical data used for the data mining sub-process.

9. The computer program product of claim 6 wherein the graphical user interface is configured to receive user input defining how a particular error is to be processed during the data analysis process.

10. The computer program product of claim 6 wherein the graphical user interface is configured to receive user input identifying a computing device or a component of a computing device to be used during the execution of one of the identified sub-processes.

11. The computer program product of claim 6 wherein the graphical user interface is configured to receive user input identifying an order in which each of the identified sub-processes are to be performed when performing the data analysis process.

12. The computer program product of claim 6 wherein the graphical user interface is configured to receive user input identifying when the data analysis process is to be initiated.

13. A computer-implemented method for receiving information from a user for use in a data analysis process, the method comprising:
    receiving user input identifying a data analysis process;
    receiving multiple sub-process user inputs, each sub-process user input identifying a sub-process associated with the data analysis process, wherein:
    at least one of the identified sub-processes is (1) an extraction sub-process for extracting data from a first transactional data source, (2) a transformation sub-process for transforming data extracted from the first transactional data source from a data format used by the first transactional data source to a data format used for analytical processing, (3) a loading sub-process for loading data into an analytical processing data source that is used for analytical processing, or (4) a data mining sub-process for creating a data attribute by performing an analytical process on data from the analytical processing data source, and
    at least one of the identified sub-processes is a deployment sub-process for storing a data attribute created in another of the identified sub-processes; and
    storing the input identifying the data analysis process in association with the inputs identifying the multiple sub-processes for use in the data analysis process, wherein
    the deployment sub-process stores the created data attribute in one of the first transactional data source, a second transactional data source other than the first transactional data source, or a second analytical data source used for analytical processing.

14. The method of claim 13 wherein one of the sub-process user inputs comprises a sub-process user input identifying a computer program that causes the identified sub-process to be performed.

15. The method of claim 13 further comprising receiving user inputs of meta-data elements to be used in the data analysis process wherein each meta-data element is associated with 1) a corresponding data element in the first transactional data source, 2) a corresponding data element in the analytical processing data source, or 3) both a corresponding data element in one of the first and second transactional data sources and a corresponding data element in the analytical processing data source.

16. The method of claim 13 wherein each of the multiple sub-processes use a common message format.

17. The method of claim 13 further comprising receiving user input defining how a particular error is to be processed during the data analysis process.

18. The method of claim 13 further comprising receiving user input identifying a computing device or a component of a computing device to be used during the execution of one of the multiple sub-processes.

19. The method of claim 13 further comprising receiving user input identifying an order in which the multiple sub-processes are to be performed when performing the data analysis process.

20. The method of claim 13 further comprising receiving user input identifying when the data analysis process is to be initiated.

21. The method of claim 13 wherein the deployment sub-process comprises a first deployment sub-process for storing a data attribute created in another of the identified sub-processes in a first data store and the multiple identified sub-processes further include a second deployment sub-process for storing the data attribute in a second data store.

22. The method of claim 21 wherein the first data store is the same as the second data store.

23. The method of claim 21 wherein the first data store is different from the second data store.

24. The method of claim 23 wherein the first data store comprises a transactional data store and the second data store comprises an analytical data store.

25. A computer program product tangibly embodied in a storage medium, the computer program product including instructions that, when executed, receive information from a user for use in a data analysis process, and the computer program product being configured to
    receive user input identifying a data analysis process;
    receive multiple sub-process user inputs, each sub-process user input identifying a sub-process associated with the data analysis process, wherein:

at least one of the identified sub-processes is (1) an extraction sub-process for extracting data from a first transactional data source, (2) a transformation sub-process for transforming data extracted from the first transactional data source from a data format used by the first transactional data source to a data format used for analytical processing, (3) a loading sub-process for loading data into an analytical processing data source that is used for analytical processing, or (4) a data mining sub-process for creating a data attribute by performing an analytical process on data from the analytical processing data source, and at least one of the identified sub-processes is a deployment sub-process for storing a data attribute created in another of the identified sub-processes; and store the input identifying the data analysis process in association with the inputs identifying the multiple sub-processes for use in the data analysis process, wherein the deployment sub-process stores the created data attribute in one of the first transactional data source, a second transactional data source other than the first transactional data source, or a second analytical data source used for analytical processing.

26. The computer program product of claim 25 wherein one of the sub-process inputs comprises a sub-process user input identifying a computer program that causes the identified sub-process to be performed.

27. The computer program product of claim 25 further configured to receive user inputs of meta-data elements to be used in the data analysis process wherein each meta-data element is associated with 1) a corresponding data element in the first transactional data source, 2) a corresponding data element in the analytical processing data source, or 3) both a corresponding data element in one of the first and second transactional data sources and a corresponding data element in the analytical process data source.

28. The computer program product of claim 25 wherein the deployment sub-process comprises a first deployment sub-process for storing a data attribute created in another of the identified sub-processes in a first data store and the multiple identified sub-processes further include a second deployment sub-process for storing the data attribute in a second data store.

29. A system for receiving information from a user for use in a data analysis the system comprising a processor connected to a storage device and one or more input/output devices, wherein the processor is configured to:

receive user input identifying a data analysis process;

receive multiple sub-process user inputs, each sub-process user input identifying a sub-process associated with the data analysis process, wherein:

at least one of the identified sub-processes is (1) an extraction sub-process for extracting data from a first transactional data source, (2) a transformation sub-process for transforming data extracted from the first transactional data source from a data format used by the first transactional data source to a data format used for analytical processing, (3) a loading sub-process for loading data into an analytical processing data source that is used for analytical processing, or (4) a data mining sub-process for creating a data attribute by performing an analytical process on data from the analytical processing data source, and at least one of the identified sub-processes is a deployment sub-process for storing a data attribute created in another of the identified sub-processes; and store the input identifying the data analysis process in association with the inputs identifying the multiple sub-processes for use in the data analysis process, wherein the deployment sub-process stores the created data attribute in one of the first transactional data source, a second transactional data source other than the first transactional data source, or a second analytical data source used for analytical processing.

30. A computer program product tangibly embodied in a storage medium, the computer program product including instructions that when executed generate a graphical user interface on a display device for using a computer to display and modify a data analysis process, the graphical user interface comprising:

a first graphical icon representing an extraction sub-process for extracting data from a first transactional data source;

a second graphical icon representing a loading sub-process for loading data into an analytical processing data source;

a third graphical icon representing a data mining sub-process for creating a data attribute by performing an analytical process on data from the analytical processing data source;

a fourth graphical icon representing a deployment sub-process for storing the created data attribute; and graphical connections between the displayed graphical icons, the graphical connections indicating a sequence with which the sub-processes represented by the displayed graphical icons are performed, wherein information representing the sequence with which the sub-processes represented by the displayed graphical icons are performed is stored in a storage medium for later access and execution of the sub-processes in the represented sequence.

31. The computer program product of claim 30 wherein the first graphical icon, the second graphical icon, the third graphical icon, and the fourth graphical icon are each displayed as different shapes.

32. The computer program product of claim 30, wherein the extraction sub-process is a first extraction sub-process, the loading sub-process is a first loading sub-process, and the deployment sub-process is a first deployment sub-process, further comprising:

a fifth graphical icon representing a second extraction sub-process for extracting data from a first transactional data source;

a sixth graphical icon representing a second loading sub-process for loading data into an analytical processing data source; and a seventh graphical icon representing a second deployment sub-process for storing the created data attribute.

33. The computer program product of claim 32 wherein:

the graphical connections connect the second and sixth graphical icons to the third graphical icon to indicate that a flow of the data analysis process from each of the first and second loading sub-processes leads to the data mining sub-process; and the graphical connections connect the third graphical icon to the fourth and seventh graphical icons to indicate that the flow of the data analysis process from the data mining sub-process leads to each of the first and second deployment sub-processes.

34. The computer program product of claim 30 further comprising a fifth graphical icon representing a transformation sub-process for transforming the extracted data from a data format used by the first transactional data source to a data format used for analytical processing.

35. The computer program product of claim 30 wherein the fourth graphical icon represents a deployment sub-process for storing the created data attribute in one of the first transactional data source, a second transactional data source other than the first transactional data source, or a second analytical data source used for analytical processing.

* * * * *